(12) United States Patent
Sridhara et al.

(10) Patent No.: US 9,684,787 B2
(45) Date of Patent: Jun. 20, 2017

(54) METHOD AND SYSTEM FOR INFERRING APPLICATION STATES BY PERFORMING BEHAVIORAL ANALYSIS OPERATIONS IN A MOBILE DEVICE

(71) Applicant: QUALCOMM Incorporated, San Diego, CA (US)

(72) Inventors: Vinay Sridhara, Santa Clara, CA (US); Rajarshi Gupta, Sunnyvale, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 14/247,400

(22) Filed: Apr. 8, 2014

(65) Prior Publication Data
US 2015/0286820 A1 Oct. 8, 2015

(51) Int. Cl.
G06F 21/56 (2013.01)
G06F 9/48 (2006.01)
G06F 1/32 (2006.01)

(52) U.S. Cl.
CPC .......... G06F 21/566 (2013.01); G06F 1/3206 (2013.01); G06F 9/4893 (2013.01)

(58) Field of Classification Search
CPC ..... H04W 24/08; H04W 4/003; H04W 12/02; H04W 88/02; H04L 63/1408; H04L 43/00;
(Continued)

(56) References Cited

U.S. PATENT DOCUMENTS 7,818,800 B1 10/2010 Lemley, III et al.
8,010,773 B2 8/2011 Bostanci et al.
(Continued)

FOREIGN PATENT DOCUMENTS

WO 02103498 A2 12/2002
WO 2013173001 A1 11/2013

OTHER PUBLICATIONS

International Search Report and Written Opinion—PCT/US2015/024254—ISA/EPO—Jul. 6, 2015.
(Continued)

*Primary Examiner* — Tu Nguyen
(74) *Attorney, Agent, or Firm* — The Marbury Law Group, PLLC

(57) ABSTRACT

Methods, systems and devices compute and use the actual execution states of software applications to implement power saving schemes and to perform behavioral monitoring and analysis operations. A mobile device may be configured to monitor an activity of a software application, generate a shadow feature value that identifies actual execution state of the software application during that activity, generate a behavior vector that associates the monitored activity with the shadow feature value, and determine whether the activity is malicious or benign based on the generated behavior vector, shadow feature value and/or operating system execution states. The mobile device processor may also be configured to intelligently determine whether the execution state of a software application is relevant to determining whether any of the monitored mobile device behaviors are malicious or suspicious, and monitor only the execution states of the software applications for which such determinations are relevant.

30 Claims, 13 Drawing Sheets

(58) Field of Classification Search
CPC ...... G06F 21/566; G06F 21/55; G06F 9/4893; G06F 1/3206
USPC .......................................................... 726/23
See application file for complete search history.

(56) References Cited

U.S. PATENT DOCUMENTS

| | | |
|---|---|---|
| 8,370,931 B1 | 2/2013 | Chien et al. |
| 8,434,151 B1 | 4/2013 | Franklin |
| 8,479,286 B2 | 7/2013 | Dalcher et al. |
| 2008/0184225 A1* | 7/2008 | Fitzgerald ............... G06F 9/455 718/1 |
| 2009/0199296 A1 | 8/2009 | Xie et al. |
| 2010/0251000 A1 | 9/2010 | Lyne et al. |
| 2012/0210423 A1 | 8/2012 | Friedrichs et al. |
| 2013/0097706 A1 | 4/2013 | Titonis et al. |
| 2013/0298244 A1* | 11/2013 | Kumar .................... G06F 21/52 726/25 |
| 2013/0304677 A1 | 11/2013 | Gupta et al. |

OTHER PUBLICATIONS

Iyenggar A., et al., "Unified Power Management Framework for Portable Media Devices", Portable Information Devices, 2007. PORTABLE07. IEEE International Con Ference On, IEEE, PI, May 1, 2007 (May 1, 2007), pp. 1-5, XP031094621, ISBN: 978-1-4244-1039-2.

* cited by examiner

METHOD AND SYSTEM FOR INFERRING APPLICATION STATES BY PERFORMING BEHAVIORAL ANALYSIS OPERATIONS IN A MOBILE DEVICE

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become more complex than ever, and now commonly include multiple processors, system-on-chips (SoCs), and other resources that allow mobile device users to execute complex and power intensive software applications (e.g., video streaming, video processing, etc.) on their mobile devices. With this rise in complexity and power consumption, new and improved processing solutions that better utilize the mobile device's resources and capabilities will be beneficial to consumers.

SUMMARY

The various aspects include methods of determining an execution state of a software application in a mobile device by monitoring in a processor of the mobile device an activity of a software application or process to collect behavior information, generating a behavior vector based on the collected behavior information, and determining the execution state of the software application or process by applying a classifier model to the behavior vector. In an aspect, the method may include selecting a power saving scheme based on the determined execution state, and implementing the selected power saving scheme. In a further aspect, the method may include anticipating a future execution state of the software application or process by applying the classifier model to the behavior vector, and informing a scheduler of the determined future execution state so as to enable the scheduler to perform an action consistent with the determined future execution state.

In a further aspect, the method may include determining an operating system execution state of the software application or process, and determining whether the determined operating system execution state is the same as the determined execution state. In a further aspect, the method may include classifying the software application as not benign in response to determining that operating system execution state is not the same as the determined execution state. In a further aspect, the method may include selecting a behavior classifier model based on the determined execution state, and using the selected behavior classifier model to determine whether the software application is not benign. In a further aspect, selecting a behavior classifier model based on the determined execution state may include selecting an application specific classifier model. In a further aspect, selecting a behavior classifier model based on the determined execution state may include identifying mobile device features used by the software application, and selecting the behavior classifier model to include the identified features.

In a further aspect, the method may include determining whether the execution state of the software application or process is relevant to the activity, generating a shadow feature value that identifies the execution state of the software application or process during which the activity was monitored in response to determining that the execution state is relevant to the activity, generating a second behavior vector that associates the activity with the shadow feature value identifying the execution state, and using the second behavior vector to determine whether the activity is not benign.

Further aspects include a computing device that may include a processor configured with processor-executable instructions to perform operations including monitoring an activity of a software application or process to collect behavior information, generating a behavior vector based on the collected behavior information, and determining the execution state of the software application or process by applying a classifier model to the behavior vector. In an aspect, the processor may be configured with processor-executable instructions to perform operations that include selecting a power saving scheme based on the determined execution state, and implementing the selected power saving scheme.

In a further aspect, the processor may be configured with processor-executable instructions to perform operations that include anticipating a future execution state of the software application or process by applying the classifier model to the behavior vector, and informing a scheduler of the determined future execution state so as to enable the scheduler to perform an action consistent with the determined future execution state. In a further aspect, the processor may be configured with processor-executable instructions to perform operations that include determining an operating system execution state of the software application or process, and determining whether the determined operating system execution state is the same as the determined execution state. In a further aspect, the processor may be configured with processor-executable instructions to perform operations that include classifying the software application as not benign in response to determining that operating system execution state is not the same as the determined execution state.

In a further aspect, the processor may be configured with processor-executable instructions to perform operations that include selecting a behavior classifier model based on the determined execution state, and using the selected behavior classifier model to determine whether the software application is not benign. In a further aspect, the processor may be configured with processor-executable instructions to perform operations such that selecting a behavior classifier model based on the determined execution state may include selecting an application specific classifier model. In a further aspect, the processor may be configured with processor-executable instructions to perform operations such that selecting a behavior classifier model based on the determined execution state may include identifying mobile device features used by the software application, and selecting the behavior classifier model to include the identified features.

In a further aspect, the processor may be configured with processor-executable instructions to perform operations that include determining whether the execution state of the software application or process is relevant to the activity, generating a shadow feature value that identifies the execution state of the software application or process during which the activity was monitored in response to determining that the execution state is relevant to the activity, generating a second behavior vector that associates the activity with the shadow feature value identifying the execution state, and using the second behavior vector to determine whether the activity is not benign.

Further aspects include a non-transitory computer readable storage medium having stored thereon processor-executable software instructions configured to cause a mobile device processor to perform operations including monitoring an activity of a software application or process to collect behavior information, generating a behavior vector based on the collected behavior information, and determining the execution state of the software application or process by applying a classifier model to the behavior vector. In an aspect, the stored processor-executable instructions may be configured to cause a processor of a receiver device to perform operations that include selecting a power saving scheme based on the determined execution state, and implementing the selected power saving scheme.

In an aspect, the stored processor-executable software instructions may be configured to cause a processor to perform operations including anticipating a future execution state of the software application or process by applying the classifier model to the behavior vector, and informing a scheduler of the determined future execution state so as to enable the scheduler to perform an action consistent with the determined future execution state. In an aspect, the stored processor-executable software instructions may be configured to cause a processor to perform operations including determining an operating system execution state of the software application or process, and determining whether the determined operating system execution state is the same as the determined execution state.

In an aspect, the stored processor-executable software instructions may be configured to cause a processor to perform operations including classifying the software application as not benign in response to determining that operating system execution state is not the same as the determined execution state. In an aspect, the stored processor-executable software instructions may be configured to cause a processor to perform operations including selecting a behavior classifier model based on the determined execution state, and using the selected behavior classifier model to determine whether the software application is not benign. In an aspect, the stored processor-executable software instructions may be configured to cause a processor to perform operations such that selecting a behavior classifier model based on the determined execution state may include selecting an application specific classifier model.

In an aspect, the stored processor-executable software instructions may be configured to cause a processor to perform operations including such that selecting a behavior classifier model based on the determined execution state may include identifying mobile device features used by the software application, and selecting the behavior classifier model to include the identified features. In an aspect, the stored processor-executable software instructions may be configured to cause a processor to perform operations including determining whether the execution state of the software application or process is relevant to the activity, generating a shadow feature value that identifies the execution state of the software application or process during which the activity was monitored in response to determining that the execution state is relevant to the activity, generating a second behavior vector that associates the activity with the shadow feature value identifying the execution state, and using the second behavior vector to determine whether the activity is not benign.

Further aspects include a mobile computing device having means for monitoring an activity of a software application or process to collect behavior information, means for generating a behavior vector based on the collected behavior information, and means for determining the execution state of the software application or process by applying a classifier model to the behavior vector. In an aspect, the mobile computing device may include means for selecting a power saving scheme based on the determined execution state, and means for implementing the selected power saving scheme. In an aspect, the mobile computing device may include means for anticipating a future execution state of the software application or process by applying the classifier model to the behavior vector, and means for informing a scheduler of the determined future execution state so as to enable the scheduler to perform an action consistent with the determined future execution state. In further aspects the mobile computing may include means for performing functions corresponding to any of method operations discussed above.

BRIEF DESCRIPTION OF THE DRAWINGS

The accompanying drawings, which are incorporated herein and constitute part of this specification, illustrate exemplary aspect of the invention, and together with the general description given above and the detailed description given below, serve to explain the features of the invention.

DETAILED DESCRIPTION

Figure 1:
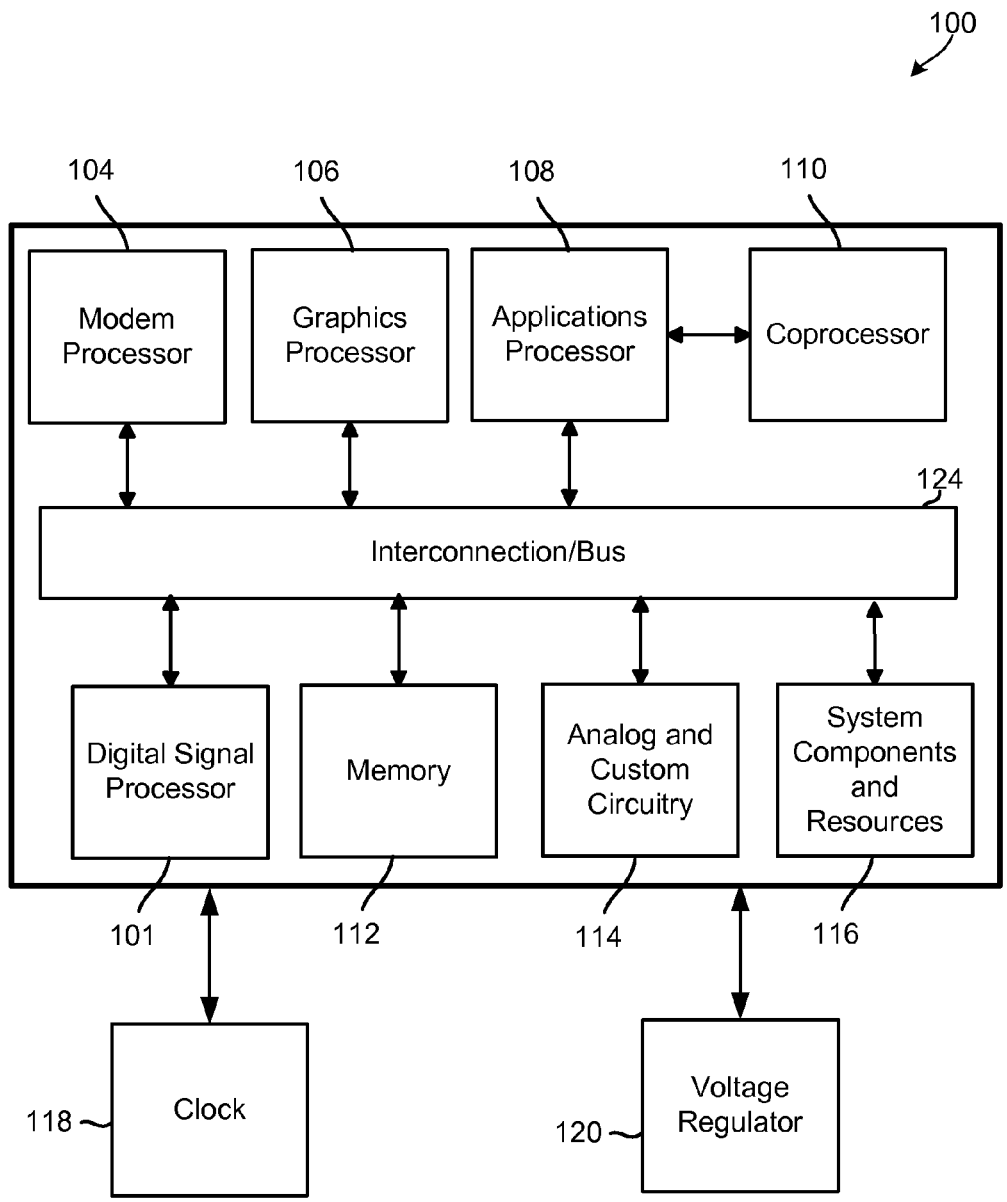
FIG. 1 is a component block diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, and mobile devices configured to implement the methods, of using machine learning techniques to determine an execution state of a software application of the mobile device independent of the execution state information that may be obtained from the operating system or the software application. In an aspect, a processor of the mobile device may be configured to use this application-and-operating-system-agnostic execution state information to implement effective power saving schemes that do not alter the device's functionality or reliability. In a further aspect, a processor of the mobile device may configured to use this application-and-operating-system-agnostic execution state information to improve the accuracy and performance of a comprehensive behavioral monitoring and analysis system, and enable the mobile device to better predict whether a mobile device behavior is benign, suspicious, malicious, or contributing the degradation in the performance and/or power consumption characteristics of the mobile device.

Generally, conventional solutions require that a computing device classify software applications as being in an execution state (e.g., background, empty, foreground, perceptible, service, and visible) that is predefined by the operating system (e.g., Android, Windows 8, etc.). However, these execution states may not accurately describe the actual operating state of the software application. In addition, this operating system execution state information (i.e., the state information provided by the operating system) often does not include enough fine grained information or details that may be used to implement an effective power saving scheme, or to accurately evaluate a complex mobile device behavior.

Because conventional solutions require that computing devices rely on the information that is provided by the operating system or the software application, these solutions may not be effective if the software application is malicious or computing device has been infected or taken over by malware. For example, if the computing device is infected by a malicious application that intercepts and alters the communications between the system software and the operating system, the system software may receive inaccurate state information, and thus not be able to use that application's actual execution state to accurately determine whether the application is malicious.

To overcome these and other limitations of conventional solutions, the various aspects include methods and mobile devices equipped with modules or components that allow the mobile device to determine an execution state of a software application independent of the execution state information that is made available by the software application or the operating system.

In an aspect, the mobile device may be equipped with a state estimation and prediction module (and/or an application execution state determination module) that is configured to receive execution, event, and/or behavior information from various software and hardware components of the mobile device. Such information may include any or all of operating state information, event information (e.g., a surface touch, click, button actuation, etc.), information from sensors indicating activity/inactivity, CPU/GPU usage levels, battery consumption levels, information identifying an implemented functionality, resource state information, memory transaction information, communication transaction information, and other types of information related to the various behaviors, activities, operations, and events ongoing in the mobile device that are related to the execution of the software application.

The state estimation and prediction module (or application execution state determination module) may apply decision rules and machine learning algorithms to the information it receives from the software and hardware components to infer, estimate, predict, or determine an execution state for the software application that is independent of the executions state information that may obtained from the operating system or the application. That is, the state estimation and prediction module may generate application-and-operating-system-agnostic execution state information that is more accurate, more detailed, and finer grained than the state information this is provided by the operating system or the software application. For example, the state estimation and prediction module may generate the execution state information to include detailed statistics regarding a duration in which a resource is used by the software application, or the frequency in which the use of that resource is requested by that software application. The mobile device may then use this information to determine whether operating system execution state information is accurate, such as whether a software application that is categorized as being in the "foreground" state by the operating system is actually in an "idle" execution state.

In an aspect, a power management module of mobile device may use the execution state information provided by the state estimation and prediction module to implement effective power saving schemes in the mobile device that balance its power consumption and performance characteristics. In another aspect, a behavioral monitoring and analysis system of the mobile device may use this execution state information to better predict whether a mobile device behavior is benign or malicious. For example, the behavioral monitoring and analysis system may use the application-and-operating-system-agnostic execution state information to identify and select an application-specific lean classifier model that evaluates the features or conditions that most relevant to analyzing a complex mobile device behavior associated with the execution of the software application.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices that have limited resources and run on battery power, such as smartphones, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium Short Message Service messages, etc.), denial of service (DoS), operations relating to commandeering, etc.

As mentioned above, determining the state of an application based on observed behaviors may be useful to systems and methods that monitor mobile device behavior to identify performance degrading problems and malware. Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of the mobile device over time, including poorly designed software applications, malware, viruses, fragmented memory, background processes, etc. Due to the number, variety, and complexity of these factors, it is often not feasible to evaluate all the various processes, components, behaviors, or factors (or combinations thereof) that may degrade performance and/or power utilization levels of the complex yet resource-constrained systems of modern mobile devices. As such, it is difficult for users, operating systems, and/or application programs (e.g., anti-virus software, etc.) to accurately and efficiently identify the sources of such problems. Therefore, mobile device users currently have few remedies for preventing the degradation in performance and power utilization levels of a mobile device over time, or for restoring an aging mobile device to its original performance and power utilization levels.

The various aspects for determining an application's state may be used by comprehensive behavioral monitoring and analysis systems for intelligently and efficiently identifying, preventing, and/or correcting the conditions, factors, and/or mobile device behaviors that often degrade a mobile device's performance and/or power utilization levels over time. In such behavioral monitoring and analysis systems, an observer process, daemon, module, or sub-system (herein collectively referred to as a "module") of the mobile device may instrument or coordinate various application programming interfaces (APIs), registers, counters or other components (herein collectively "instrumented components") at various levels of the mobile device system. The observer module may continuously (or near continuously) monitor mobile device behaviors by collecting behavior information from the instrumented component. The mobile device may also include an analyzer module, and the observer module may communicate (e.g., via a memory write operation, function call, etc.) the collected behavior information to the analyzer module. The analyzer module may be configured to perform real-time behavior analysis operations, which may include performing, executing, and/or applying data, algorithms, classifiers or models (herein collectively referred to as "classifier models") to the collected behavior information to determine whether a mobile device behavior is benign or not benign (e.g., malicious or performance-degrading). The mobile device may then use the results of this analysis to heal, cure, isolate, or otherwise fix or respond to identified problems.

Generally, each software application performs a number of tasks or activities on the mobile device. Certain tasks/activities inherently require that the operating system or software application (or process, thread, etc.) be in an execution state that supports or is compatible with those tasks/activities. For example, the use of a camera, activating a microphone to record audio, sending Short Message Service (SMS) messages, and the collection accelerometer data are all tasks/activities that typically require some form of user interaction with the mobile device (e.g., the user actuating the shutter-release button for the camera, typing text, hitting a send button, etc.). As such, these activities generally must be performed in the "foreground" execution state or in another execution state that supports user interaction with the mobile device.

When these or other similar tasks/activities are preformed in an execution state that does not support a high degree of user interaction with the mobile device, such as in the background, this operating condition may be an indicator that a mobile device behavior associated with that activity is malicious or otherwise merits additional or closer scrutiny, monitoring or analysis. That is, the specific execution state in which certain tasks/activities are performed in the mobile device may be an indicator of whether a mobile device behavior merits additional or closer scrutiny, monitoring and/or analysis. However, the generic and predefined execution state information provided by the operating system and the software application are often not accurate or do not include information that may be used to implement an effective power saving scheme, determine which behavior models (or classifier models) should be used to evaluate the application, and/or accurately classify a complex mobile device behavior associated with the software application as being malicious or benign.

The various aspects include mobile devices equipped with a state estimation and prediction module (and/or an application execution state determination module) that is configured to receive information from various software/hardware components of the mobile device, and apply machine learning techniques to the received information to compute the actual execution state of that application. These software/hardware components may be configured to monitor a wide variety of activities and tasks performed by or related to the execution of a software application in the mobile device, and thus have access to additional, more detailed and/or finer grained information than is typically made available by the operating system or software application. Thus, the state estimation and prediction module may generate execution state information that more accurate than the state information that is provided by, or that may be obtained from, the software application or operating system.

In addition, the state estimation and prediction module may generate execution state information that is different than the state information provided by application or operating system. For example, the state estimation and prediction module determine that the actual execution state of a software application that is categorized as being in a "foreground" execution state by the operating system is not utilizing resources used by similar applications, is not performing processing or memory access operations that are commiserate with operations performed by similar applications, and has not received user input in the past 10 seconds. In this case, the state estimation and prediction module determine that the actual execution state of the software application is "idle."

By determining the actual execution states of select software applications (or processes, threads, etc.), the various aspects allow the mobile device to implement more effective power saving schemes. For example, the mobile device may use the actual execution state of a software application to identify the actual power consumption or processing requirements of that application, and determine the processing cores that should be powered up or down to meet those requirements. The mobile device may also use this information to determine when certain processing cores should be powered up or down in order to increase its battery life, reduce latency, or improve performance.

The mobile device may also use the actual execution states of software applications to better select behavior models, focus its operations on evaluating the most import features of the mobile device, and better predict whether a behavior is benign or malicious. For example, the observer and/or analyzer modules may be configured to receive application-and-operating-system-agnostic execution state information from the state estimation and prediction module, and use the information to focus their operations on evaluating the most relevant features of the mobile device.

In various aspects, the analyzer module may be configured to use the application-and-operating-system-agnostic execution state information to select a classifier model that focuses on the features most relevant to analyzing a specific software application or behavior, to better determine the intent (malicious vs. benign) of the software application, and/or to better determine whether a mobile device behavior is performance-degrading or benign. Similarly, the observer module may be configured to use this information to better identify the features that require monitoring and/or to determine the granularity at which select features are to be monitored.

In various aspects, the observer and/or analyzer modules may be configured to use the application-and-operating-system-agnostic execution state information in conjunction with the operating system execution state information to select an application-specific lean classifier model that includes a focused data model that includes/tests only the features/entries that are most relevant for determining whether that particular software application is benign or not benign (e.g., malicious or performance-degrading).

Various aspects may include components configured to perform behavioral analysis operations to determine a state of an application or process (e.g., running in the foreground, performing a particular activity, is idle, accessing a contacts list, etc.).

The various aspects may also include components configured to use the results of the behavioral analysis operations and speculation/prediction techniques to anticipate a future behavior of the mobile device or the future states or activities of various applications or processes. The mobile device may use this anticipated future behavior/state/activity information to identify resources that have a high probability of being used in the future and perform various actions or operations to prepare for the future behavior/state/activity. For example, in an aspect, the mobile device may include a scheduler component that is configured to schedule processes or tasks for execution in a processing core of that device based on an anticipated future state and/or perform other actions or operations that are consistent with the determined future execution state.

For example, the mobile device may determine that an observed activity/state includes the reading of a contacts list, and use this information to determine/anticipate that a future activity/state is likely to include "sending an SMS message" or "establishing a voice communication link." The mobile device may then inform its operating system scheduler of these anticipated future activities/states. The scheduler may use this information to perform actions or operations that are consistent with this determined future execution activity/state. For example, the scheduler may remove a low priority process from the run queue in response to determining that an anticipated future activity is processor intensive, important, or has a high priority.

The various aspects may be implemented in a number of different mobile devices, including single processor and multiprocessor systems, and a system-on-chip (SOC). FIG. 1 illustrates an example SOC 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector coprocessor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components/resources 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to being implemented in an SOC 100 discussed above, the various aspects may be implemented in a wide variety of computing systems, which may include a single processor, multiple processors, multicore processors, or any combination thereof.

Figure 2A:
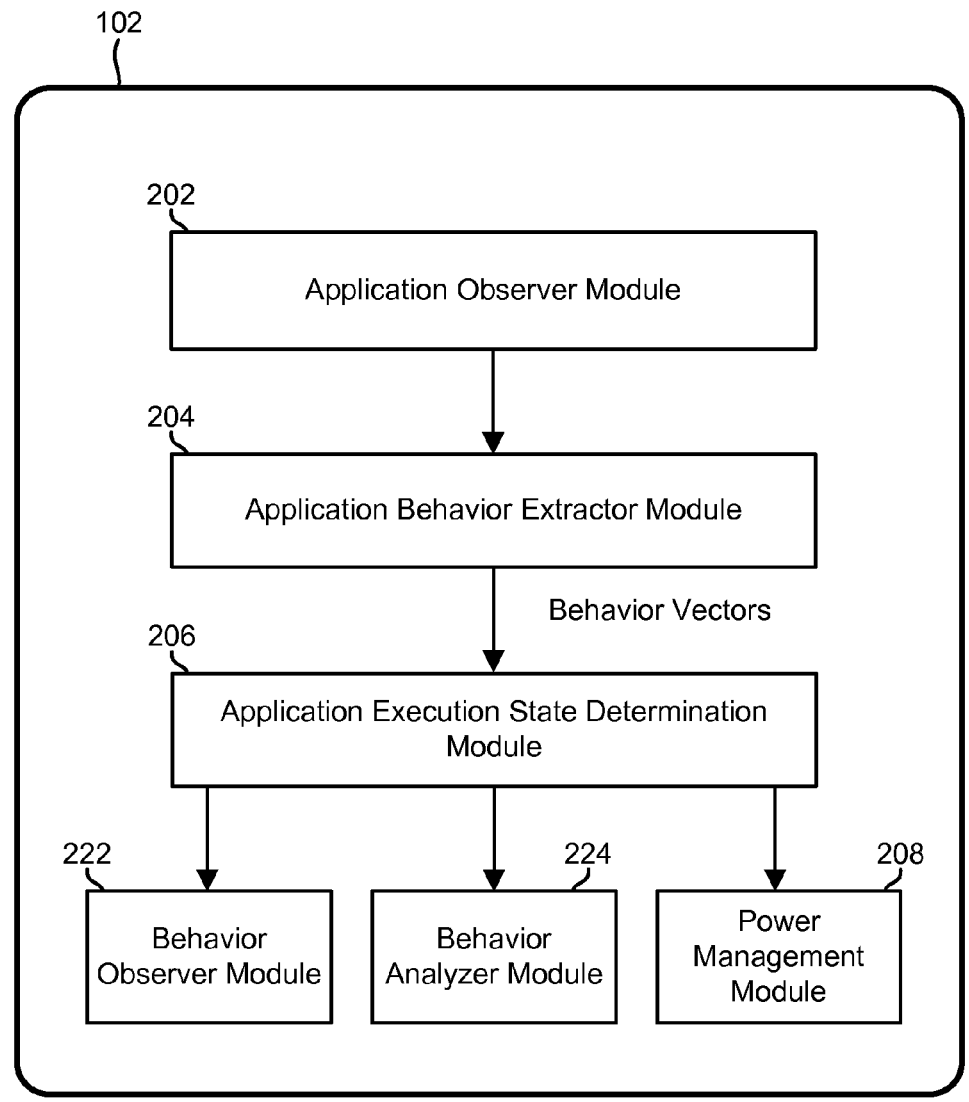
FIG. 2A is a block diagram illustrating logical components and information flows in an example mobile device configured to use machine learning techniques to determine the actual execution state of a software application in accordance with an aspect.

FIG. 2A illustrates example logical components and information flows in an aspect mobile device 102 configured to use machine learning techniques to determine an execution state of a software application of the mobile device independent of the state information that may be obtained from the operating system or the software application. In the example illustrated in FIG. 2A, the mobile device 102 includes an application observer module 202, an application behavior extractor module 204, an application execution state determination module 206, a power management module 208, a behavior observer module 222, and a behavior analyzer module 224. In an aspect, the application execution state determination module 206 may include a state estimation and prediction module (not illustrated).

Each of the modules 202-224 may be implemented in software, hardware, or any combination thereof. In various aspects, the modules 202-224 may be implemented within parts of the operating system (e.g., within the kernel, in the kernel space, in the user space, etc.), within separate programs or applications, in specialized hardware buffers or processors, or any combination thereof. In an aspect, one or more of the modules 202-224 may be implemented as software instructions executing on one or more processors of the mobile device 102.

Figure 2B:
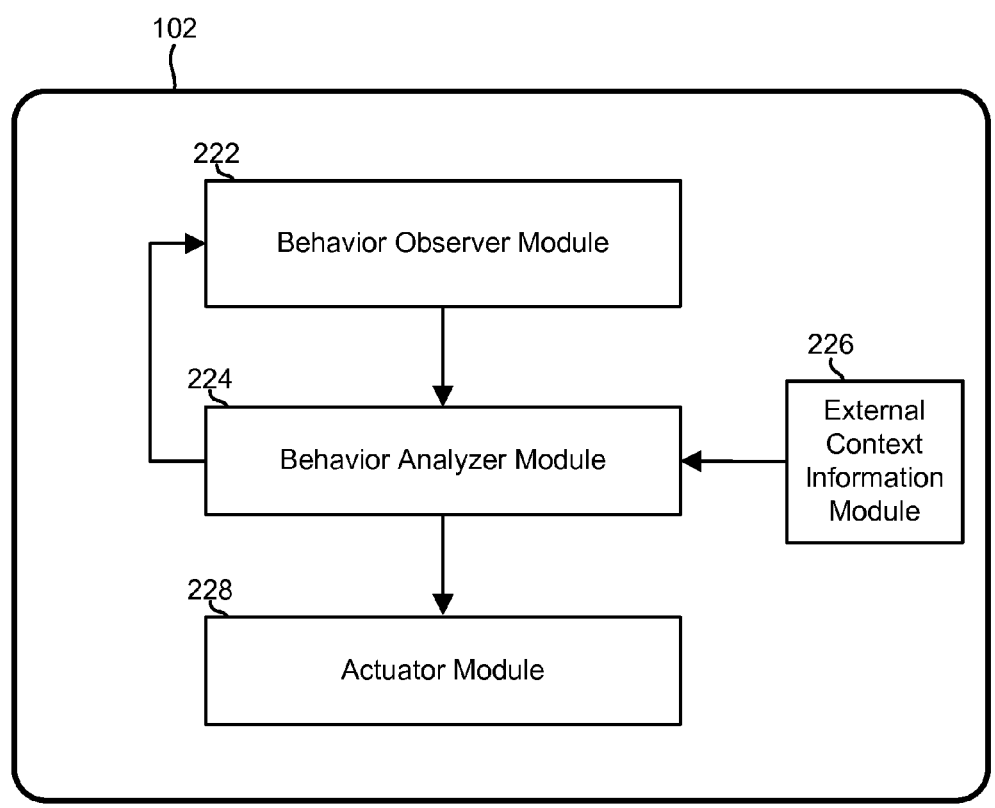
FIG. 2B is a block diagram illustrating logical components and information flows in an example mobile device configured to perform dynamic and adaptive behavioral observation and analysis operations based on the actual execution state of a software application in accordance with the various aspects.

The application observer module 202 may be configured to monitor various software and hardware components of the mobile device and collect information pertaining to the communications, transactions, events, or operations of the monitored components that are associated with the software application's performance of an operation or task, or its execution in a processing core of the mobile device. In various aspects, the application observer module 202 may be configured to monitor any or all of the features, behaviors, or components monitored by the behavior observer module 222, which is also illustrated in FIG. 2B and discussed in detail further below. The application observer module 202 may also be configured to continually monitor the mobile device for changes in the mobile device's configuration and/or state as a result of the operations of a software application. The application observer module 202 may also monitor configuration and/or state changes that may impact the performance or effectiveness of the mobile device. The application observer module 202 may store the collected information in a memory (e.g., in a log file, etc.) and/or send (e.g., via memory writes, function calls, etc.) the generated observations to the application behavior extractor module 204.

The application behavior extractor module 204 may be configured to generate one or more behavior vectors based the observations or information collected by the application observer module 202. This information may include operating state information, event information (e.g., a surface touch, click, button actuation, etc.), information from sensors indicating activity/inactivity, CPU/GPU usage levels, battery consumption levels, information identifying an implemented functionality, resource state information, memory transaction information, communication transaction information, and other types of information related to the various activities and events ongoing in the mobile device. In various aspects, the application behavior extractor module 204 may be configured to perform any or all of operations that may be performed by the behavior analyzer module 224 (discussed in detail further below) to extract the behavior of the software application. The application behavior extractor module 204 may send the generated behavior vectors and/or the extracted behavior information the application execution state determination module 206 for further analysis.

The application execution state determination module 206 may receive behavior vectors and compare them to one or more behavior modules to determine the precise execution state of the software application. In an aspect, these behavior modules may be classifier models that include a plurality of test conditions suitable for evaluating or identifying the mobile device features used by a specific software application. The features used by the specific software application or a specific software application-type may be determined by monitoring or evaluating mobile device operations, mobile device events, data network activity, system resource usage, mobile device state, inter-process communications, driver statistics, hardware component status, hardware counters, actions or operations of software applications, software downloads, changes to device or component settings, conditions and events at an application level, conditions and events at the radio level, conditions and events at the sensor level, location hardware, personal area network hardware, microphone hardware, speaker hardware, camera hardware, screen hardware, universal serial bus hardware, synchronization hardware, location hardware drivers, personal area network hardware drivers, near field communication hardware drivers, microphone hardware drivers, speaker hardware drivers, camera hardware drivers, gyroscope hardware drivers, browser supporting hardware drivers, battery hardware drivers, universal serial bus hardware drivers, storage hardware drivers, user interaction hardware drivers, synchronization hardware drivers, radio interface hardware drivers, and location hardware, near field communication (NFC) hardware, screen hardware, browser supporting hardware, storage hardware, accelerometer hardware, synchronization hardware, dual SIM hardware, radio interface hardware, and features unrelated related to any specific hardware.

In an aspect, the application execution state determination module 206 may be configured to apply classifier models to the behavior vectors to infer, estimate, predict, or determine an execution state for the software application that is independent of the state information obtained from the operating system or the software application. That is, the application execution state determination module 206 may generate application-and-operating-system-agnostic execution state information that is more accurate, detailed, and finer grained than the state information provided by the operating system or the software application. The application execution state determination module 206 may also generate the application-and-operating-system-agnostic execution state information that includes detailed statistics regarding the duration that a resource is used or frequently in which the resource is requested by application. In various aspects, the application execution state determination module 206 may be configured to perform any or all of operations that may be performed by the behavior analyzer module 224 to determine the actual execution state of the software application.

The application execution state determination module 206 may be configured to send the determined execution state information to the behavior observer module 222, behavior analyzer module 224, and/or the power management module 208.

The power management module 208 may be configured to use the execution state information to select or implement a power saving scheme that places various resources and processing cores in a low power state. In various aspect, the power management module 208 may use the execution state information to identify the power consumption or processing requirements of the software application, and determine the processing cores that should be powered up or down based on these power consumption or processing requirements. The power management module 208 may also determine when the processing cores should be powered up in order to achieve an optimal balance of power consumption and performance on the mobile computing device.

The behavior observer module 222 may be configured to use the execution state information focus its operations on monitoring the features or conditions that are most relevant to classifying the software application or a behavior of the mobile device. Similarly, the behavior analyzer module 224 may be configured to use the state information focus its operations on analyzing the features or conditions that are most relevant to determining whether the software application or a behavior of the mobile device is malicious or benign. For example, the behavior observer module 222 and/or behavior analyzer module 224 may use the application-and-operating-system-agnostic execution state information in conjunction with the operating system execution state information to select an application specific lean classifier model that identifies the mobile device features that are to be monitored and/or analyzed in order to determine whether the software application or a mobile device behavior is malicious or benign. The behavior observer module 222 and behavior analyzer module 224 are discussed in more detail with reference to FIG. 2B further below.

FIG. 2B illustrates example logical components and information flows in an aspect mobile device 102 configured to determine whether a particular mobile device behavior, software application or process is malicious/performance-degrading, suspicious, or benign. In the example illustrated in FIG. 2B, the mobile device 102 includes a behavior observer module 222, a behavior analyzer module 224, an external context information module 226, and an actuator module 228.

Each of the modules 222-228 may be implemented in software, hardware, or any combination thereof. In various aspects, the modules 222-228 may be implemented within parts of the operating system (e.g., within the kernel, in the kernel space, in the user space, etc.), within separate programs or applications, in specialized hardware buffers or processors, or any combination thereof. In an aspect, one or more of the modules 222-228 may be implemented as software instructions executing on one or more processors of the mobile device 102.

The behavior observer module 222 may be configured to instrument or coordinate application programming interfaces (APIs) at various levels/modules of the mobile device, and monitor/observe mobile device operations and events (e.g., system events, state changes, etc.) at the various levels/modules over a period of time via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 224.

The behavior observer module 222 may monitor/observe mobile device operations and events by collecting information pertaining to library application programming interface (API) calls in an application framework or run-time libraries, system call APIs, file-system and networking subsystem operations, device (including sensor devices) state changes, and other similar events. The behavior observer module 222 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 222 may also monitor data network activity, which may include types of connections, protocols, port numbers, server/client that the device is connected to, the number of connections, volume or frequency of communications, etc. The behavior observer module 222 may monitor phone network activity, which may include monitoring the type and number of calls or messages (e.g., SMS, etc.) sent out, received, or intercepted (e.g., the number of premium calls placed).

The behavior observer module 222 may also monitor the system resource usage, which may include monitoring the number of forks, memory access operations, number of files open, etc. The behavior observer module 222 may monitor the state of the mobile device, which may include monitoring various factors, such as whether the display is on or off, whether the device is locked or unlocked, the amount of battery remaining, the state of the camera, etc. The behavior observer module 222 may also monitor inter-process communications (IPC) by, for example, monitoring intents to crucial services (browser, contracts provider, etc.), the degree of inter-process communications, pop-up windows, etc.

The behavior observer module 222 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 222 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 222 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 222 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 222 may monitor/observe usage of and updates/changes to compass information, mobile device settings, battery life, gyroscope information, pressure sensors, magnet sensors, screen activity, etc. The behavior observer module 222 may monitor/observe notifications communicated to and from a software application (AppNotifications), application updates, etc. The behavior observer module 222 may monitor/observe conditions or events pertaining to a first software application requesting the downloading and/or install of a second software application. The behavior observer module 222 may monitor/observe conditions or events pertaining to user verification, such as the entry of a password, etc.

The behavior observer module 222 may be configured to monitor/observe any of the mobile device behaviors over a period of time. These observations may be for a set period of time or may be cumulative, such as in a continuous learning process. Thus, the longer that the mobile device operates, the more behavioral observations may be collected.

The behavior observer module 222 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal/etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile device before establishing radio communication links or transmitting information, dual/multiple subscriber identification module (SIM) cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 222 may perform coarse observations by monitoring/observing an initial set of behaviors or factors that are a small subset of all factors that could contribute to the mobile device's degradation. In an aspect, the behavior observer module 222 may receive the initial set of behaviors and/or factors from a server module and/or a component in a cloud service or network. In an aspect, the initial set of behaviors/factors may be specified in classifier models.

Each classifier model may be a behavior model that includes data and/or information structures (e.g., feature vectors, behavior vectors, component lists, etc.) that may be used by a mobile device processor to evaluate a specific feature or aspect of a mobile device's behavior. Each classifier model may also include decision criteria for monitoring a number of features, factors, data points, entries, APIs, states, conditions, behaviors, applications, processes, operations, components, etc. (herein collectively "features") in the mobile device. The classifier models may be preinstalled on the mobile device, downloaded or received from a network server, generated in the mobile device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular mobile device behavior is benign or not benign (e.g., malicious or performance-degrading).

A locally generated lean classifier model is a lean classifier model that is generated in the mobile device. An application-based classifier model may be an application specific classifier model or an application-type specific classifier model. An application specific classifier model is a classifier model that includes a focused data model that includes/tests only the features/entries that are most relevant for determining whether a particular software application is benign or not benign (e.g., malicious or performance-degrading). An application-type specific classifier model is a classifier model that includes a focused data model that includes/tests only the features/entries that are most relevant for determining whether a particular type of software application is benign or not benign (e.g., malicious or performance-degrading). A device-specific classifier model is a classifier model that includes a focused data model that includes/tests only mobile device-specific features/entries that are determined to be most relevant to classifying a behavior in a specific mobile device. A device-type-specific classifier model is a classifier model that includes a focused data model that includes/tests only the features/entries that are most relevant to classifying a behavior in a specific type of mobile device (e.g., same manufacturer, model, configuration, etc.).

In an aspect, the behavior analyzer module 224 may receive the observations from the behavior observer module 222, compare the received information (i.e., observations) and contextual information received from the external context information module 226, and apply classifier modules to the received information to identify subsystems, processes, and/or applications associated with the received observations that are contributing to (or are likely to contribute to) the device's degradation over time, or which may otherwise cause problems on the device.

In an aspect, the behavior analyzer module 224 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 224 may be configured to analyze information (e.g., in the form of observations) collected from various modules (e.g., the behavior observer module 222, external context information module 226, etc.), learn the normal operational behaviors of the mobile device, and generate one or more behavior vectors based the results of the comparisons. The behavior analyzer module 224 may also apply the behavior vectors to classifier modules to determine whether a particular mobile device behavior, software application, or process is performance-degrading/malicious, benign, or suspicious.

When the behavior analyzer module 224 determines that a behavior, software application, or process is malicious or performance-degrading, the behavior analyzer module 224 may notify the actuator module 228, which may perform various actions or operations to correct mobile device behaviors determined to be malicious or performance-degrading and/or perform operations to heal, cure, isolate, or otherwise fix the identified problem.

When the behavior analyzer module 224 determines that a behavior, software application, or process is suspicious, the behavior analyzer module 224 may notify the behavior observer module 222, which may adjust the granularity of its observations (i.e., the level of detail at which mobile device behaviors are observed) and/or change the behaviors that are observed based on information received from the behavior analyzer module 224 (e.g., results of the real-time analysis operations), generate or collect new or additional behavior information, and send the new/additional information to the behavior analyzer module 224 for further analysis/classification. Such feedback communications between the behavior observer module 222 and the behavior analyzer module 224 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enable the mobile device 102 to adjust or modify the classifier models locally in the mobile device without consuming an excessive amount of the mobile device's processing, memory, or energy resources.

In an aspect, the behavior observer module 222 and the behavior analyzer module 224 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 222 enables the mobile computing device 102 to efficiently identify and prevent problems from occurring on mobile computing devices without requiring a large amount of processor, memory, or battery resources on the device.

In various aspects, the behavior observer module 222 and/or the behavior analyzer module 224 may be configured to analyze mobile device behaviors by identifying a critical data resource that requires close monitoring, identifying an intermediate resource associated with the critical data resource, monitoring API calls made by a software application when accessing the critical data resource and the intermediate resource, identifying mobile device resources that are consumed or produced by the API calls, identifying a pattern of API calls as being indicative of malicious activity by the software application, generating a light-weight behavior signature based on the identified pattern of API calls and the identified mobile device resources, using the light-weight behavior signature to perform behavior analysis operations, and determining whether the software application is malicious or benign based on the behavior analysis operations.

In various aspects, the behavior observer module 222 and/or the behavior analyzer module 224 may be configured to analyze mobile device behaviors by identifying APIs that are used most frequently by software applications executing on the mobile device, storing information regarding usage of identified hot APIs in an API log in a memory of the mobile device, and performing behavior analysis operations based on the information stored in the API log to identify mobile device behaviors that are inconsistent with normal operation patterns. In an aspect, the API log may be generated so that it is organized such that that the values of generic fields that remain the same across invocations of an API are stored in a separate table as the values of specific fields that are specific to each invocation of the API. The API log may also be generated so that the values of the specific fields are stored in a table along with hash keys to the separate table that stores the values of the generic fields.

In various aspects, the behavior observer module 222 and/or the behavior analyzer module 224 may be configured to analyze mobile device behaviors by receiving a full classifier model that includes a finite state machine that is suitable for conversion or expression as a plurality of boosted decision stumps, generating a lean classifier model in the mobile device based on the full classifier, and using the lean classifier model in the mobile device to classify a behavior of the mobile device as being either benign or not benign (i.e., malicious, performance degrading, etc.). In an aspect, generating the lean classifier model based on the full classifier model may include determining a number of unique test conditions that should be evaluated to classify a mobile device behavior without consuming an excessive amount of processing, memory, or energy resources of the mobile device, generating a list of test conditions by sequentially traversing the list of boosted decision stumps and inserting the test condition associated with each sequentially traversed boosted decision stump into the list of test conditions until the list of test conditions may include the determined number of unique test conditions, and generating the lean classifier model to include only those boosted decision stumps that test one of a plurality of test conditions included in the generated list of test conditions.

In various aspects, the behavior observer module 222 and/or the behavior analyzer module 224 may be configured to use device-specific information, such as capability and state information, of the mobile device to identify mobile device-specific test conditions in a plurality of test conditions that are relevant to classifying a behavior of the mobile device, generate a lean classifier model that includes only the identified mobile device-specific test conditions, and use the generated lean classifier model in the mobile device to classify the behavior of the mobile device. In an aspect, the lean classifier model may be generated to include only decision nodes that evaluate a mobile device feature that is relevant to a current operating state or configuration of the mobile device. In a further aspect, generating the lean classifier model may include determining a number of unique test conditions that should be evaluated to classify the behavior without consuming an excessive amount of mobile device's resources (e.g., processing, memory, or energy resources), generating a list of test conditions by sequentially traversing the plurality of test conditions in the full classifier model, inserting those test conditions that are relevant to classifying the behavior of the mobile device into the list of test conditions until the list of test conditions includes the determined number of unique test conditions, and generating the lean classifier model to include decision nodes included in the full classifier model that test one of the conditions included in the generated list of test conditions.

In various aspects, the behavior observer module 222 and/or the behavior analyzer module 224 may be configured to recognize mobile device behaviors that are inconsistent with normal operation patterns of the mobile device by monitoring an activity of a software application or process, determining an operating system execution state of the software application/process, and determining whether the activity is benign based on the activity and/or the operating system execution state of the software application or process during which the activity was monitored. In an further aspect, the behavior observer module 222 and/or the behavior analyzer module 224 may determine whether the operating system execution state of the software application or process is relevant to the activity, generate a shadow feature value that identifies the operating system execution state of the software application or process during which the activity was monitored, generate a behavior vector that associates the activity with the shadow feature value identifying the operating system execution state, and use the behavior vector to determine whether the activity is benign, suspicious, or not benign (i.e., malicious or performance-degrading).

In various aspects, the behavior observer module 222 and/or the behavior analyzer module 224 may be configured to recognize mobile device behaviors that are inconsistent with normal operation patterns of the mobile device by monitoring an activity of a software application or process, determining an application-and-operating-system-agnostic execution state of the software application/process, and determining whether the activity is benign based on the activity and/or the application-and-operating-system-agnostic execution state of the software application during which the activity was monitored. In an further aspect, the behavior observer module 222 and/or the behavior analyzer module 224 may determine whether the application-and-operating-system-agnostic execution state of the software application is relevant to the activity, and generate a behavior vector that associates the activity with the application-and-operating-system-agnostic execution state, and use the behavior vector to determine whether the activity is benign, suspicious, or not benign (i.e., malicious or performance-degrading). The mobile device may also use the application-and-operating-system-agnostic execution state to select a classifier model (e.g., application-specific classifier model), and apply the behavior vector to the selected classifier model to determine whether a mobile device behavior is inconsistent with normal operation patterns of the mobile device.

In various aspects, the mobile device 102 may be configured to work in conjunction with a network server to intelligently and efficiently identify the features, factors, and data points that are most relevant to determining whether a mobile device behavior is benign or not benign (e.g., malicious or performance-degrading). For example, the mobile device 102 may be configured to receive a full classifier model from the network server, and use the received full classifier model to generate lean classifier models (i.e., data/behavior models) that are specific for the features and functionalities of the mobile device or the software applications of the mobile device.

In an aspect, the mobile device 102 may be configured to use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the model cannot categorize as either benign or malicious (and therefore is categorized by the model as suspicious), at which time a more robust (i.e., less lean) lean classifier model may be applied in an attempt to categorize the behavior as either benign or malicious. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various aspects, the mobile device 102 may be configured to generate one or more lean classifier models by converting a finite state machine representation/expression into boosted decision stumps, pruning or culling the full set of boosted decision stumps based on mobile device-specific states, features, behaviors, conditions, or configurations to include subset or subsets of boosted decision stumps included in the full classifier model, and using the subset or subsets of boosted decision stumps to intelligently monitor, analyze and/or classify a mobile device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the mobile device).

In an aspect, the mobile device 102 may be configured to generate a lean classifier model that includes a subset of classifier criteria included in the full classifier model and only those classifier criteria corresponding to the features relevant to the mobile device configuration, functionality and connected/included hardware. The mobile device 102 may use this lean classifier model(s) to monitor only those features and functions present or relevant to the device. The mobile device may then periodically modify or regenerate the lean classifier model(s) to include or remove various features and corresponding classifier criteria based on the mobile device's current state and configuration.

As an example, the behavior analyzer module 222 may be configured to receive a large boosted decision stumps classifier model with decision stumps associated with a full feature set of behavior models (e.g., classifiers), and the behavior analyzer module 224 may derive one or more lean classifier models from the large classifier models by selecting only features from the large classifier model(s) that are relevant the mobile device's current configuration, functionality, operating state and/or connected/included hardware, and including in the lean classifier model a subset of boosted decision stumps that correspond to the selected features. In this aspect, the classifier criteria corresponding to features relevant to the mobile device may be those boosted decision stumps included in the large classifier model that test at least one of the selected features. The behavior analyzer module 224 may then periodically modify or regenerate the boosted decision stumps lean classifier model(s) to include or remove various features based on the mobile device's current state and configuration so that the lean classifier model continues to include application-specific or device-specific feature boosted decision stumps.

In addition, the mobile device 102 may also dynamically generate application-specific and/or application-type specific classifier models that identify conditions or features that are relevant to a specific software application (Google® wallet) and/or to a specific type of software application (e.g., games, navigation, financial, news, productivity, etc.). In an aspect, these application-based classifier models (i.e., the application-specific and application-type specific classifier models) may be generated to include a reduced and more focused subset of the decision nodes that are included in the received full classifier model or of those included in lean classifier model generated from the received full classifier model.

In various aspects, the mobile device 102 may be configured to generate application-based classifier models for each software application in the system and/or for each type of software application in the system. The mobile device 102 may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various aspects, the mobile device 102 may be configured to generate the application-based classifier models dynamically, reactively, proactively, and/or every time a new application is installed or updated.

In an aspect, the mobile device 102 may be configured to use or apply multiple classifier models in parallel. In various aspects, the mobile device 102 may be configured to give preference or priority to the results generated from using or applying the application-based classifier models to a behavior/feature vector over the results generated from using/applying a more generic and locally generated lean classifier model to the same or different behavior/feature vector when evaluating a specific software application. In the various aspects, the mobile device 102 may use the results of applying the classifier models to predict whether a software application, process, or complex mobile device behavior is benign or contributing to the degradation of the performance or power consumption characteristics of the mobile device.

As mentioned above, each software application generally performs a number of tasks or activities on the mobile device, and the specific execution state in which certain tasks/activities are performed in the mobile device may be a strong indicator of whether a mobile device behavior merits additional or closer scrutiny, monitoring and/or analysis. As such, in the various aspects, a processor of the mobile device 102 may be configured with processor-executable instructions to use information identifying the actual execution states in which certain tasks/activities are performed to focus its behavioral monitoring and analysis operations and better determine whether a mobile device behavior is benign, suspicious, or malicious/performance-degrading.

In various aspects, the behavior observer module 222 and/or the behavior analyzer module 224 may be configured to associate the activities/tasks performed by a software application with the execution states in which those activities/tasks were performed. For example, the observer module may be configured to generate a behavior vector that includes the behavior information collected from monitoring the instrumented components in a sub-vector or data-structure that lists the features, activities, or operations of the software for which the execution state is relevant (e.g., location access, SMS read operations, sensor access, etc.). In an aspect, this sub-vector/data-structure may be stored in association with a shadow feature value sub-vector/data-structure that identifies the execution state in which each feature/activity/operation was observed. As an example, the observer module may generate a behavior vector that includes a "location_background" data field whose value identifies the number or rate that the software application accessed location information when it was operating in a background state. This allows the analyzer module to analyze this execution state information independent of and/or in parallel with the other observed behaviors of the mobile device. Generating the behavior vector in this manner also allows the system to aggregate information (e.g., frequency or rate) over time.

In various aspects, the behavior observer module 222 and/or the behavior analyzer module 224 may be configured to generate the behavior vectors to include a concise definition of the observed behaviors. The behavior vector may succinctly describe an observed behavior of the mobile device, software application, or process in a value or vector data-structure (e.g., in the form of a string of numbers, etc.). The behavior vector may also function as an identifier that enables the mobile device system to quickly recognize, identify, and/or analyze mobile device behaviors. In the various aspects, the observer and/or analyzer modules may be configured to generate the behavior vectors to include series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internes messages have been communicated (e.g., number of SMS messages, etc.), etc.

In various aspects, the behavior observer module 222 and/or the behavior analyzer module 224 may be configured to generate the behavior vectors to include execution information. The execution information may be included in the behavior vector as part of a behavior (e.g., camera used 5 times in 3 second by a background process, camera used 3 times in 3 second by a foreground process, etc.) or as part of an independent feature. In an aspect, the execution state information may be included in the behavior vector as a shadow feature value sub-vector or data structure. In an aspect, the behavior vector may store the shadow feature value sub-vector/data structure in association with the features, activities, tasks for which the execution state is relevant.

FIGS. 3A-E illustrate aspect methods that may be performed by a processing core of a mobile device 102 to determine and use the actual execution state of a software application to improve the performance and power consumption characteristics of the mobile device 102.

Figure 3A:
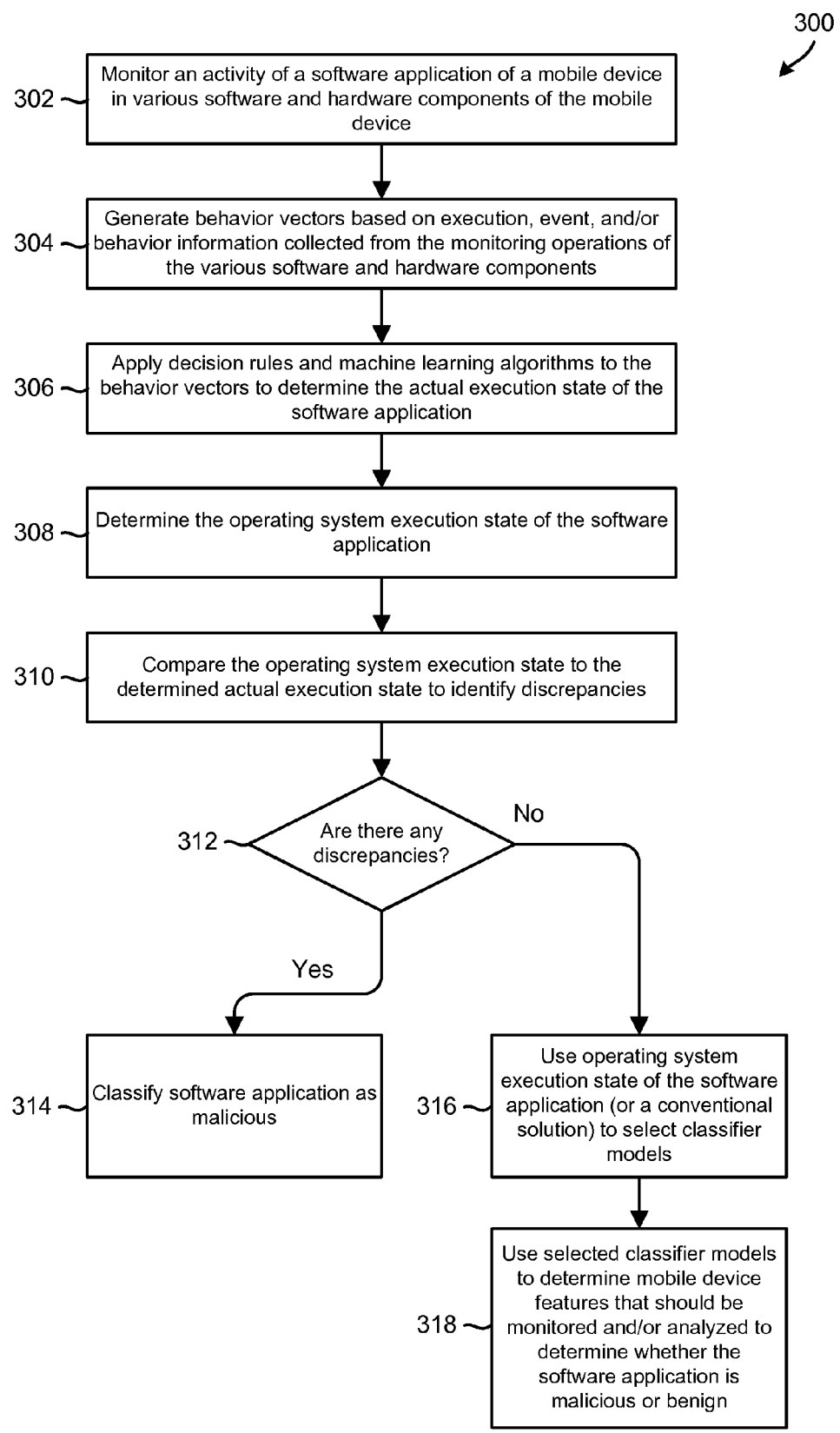
FIG. 3A is a process flow diagram illustrating an aspect method of using the actual execution state of a software application to determine whether a software application is malicious or benign.

FIG. 3A illustrates an aspect method 300 of determining and using the actual execution state of a software application to determine whether the software application is malicious or benign. Method 300 may be performed by a processing core of a mobile device 102.

In block 302, a processor of the mobile device may monitor an activity of a software application of a mobile device in various software and hardware components of the mobile device. In block 304, the mobile device processor may generate a behavior vector based on execution, event, and/or behavior information collected by the various software and hardware components. In block 306, the mobile device processor may apply decision rules and machine learning algorithms (e.g., classifier models) to the behavior vectors to determine the actual execution state of the software application. In block 308, the mobile device processor may determine the operating system execution state of the software application based on the results of applying the decision rules and machine learning algorithms (e.g., classifier models) to the behavior vectors. In block 310, the mobile device processor may compare the operating system execution state to the determined actual execution state to identify discrepancies between the actual and reported execution states.

In determination block 312, the mobile device processor may determine whether there are any discrepancies between the operating system execution state and the computed actual execution state. In response to determining that there are discrepancies between the operating system execution state and the computed actual execution state (i.e., determination block 312="Yes"), the mobile device processor may classify the software application as malicious in block 314. This determination may be made because an execution state that is different from the execution state known to the operating system indicates that the application is behaving in a what that is unusual or inconsistent with the operation system.

In response to determining that there are no discrepancies between the operating system execution state and the computed actual execution state, (i.e., determination block 312="No"), the mobile device processor may use the operating system execution state of the software application to select an appropriate classifier model to use in monitoring mobile device behavior in block 316. Thus, if the execution state is consistent with the state known to the operating system, that execution state can be used to select a state-specific classifier model for use by the observer and analyzer modules to monitor behaviors of the mobile device executing the application. In block 318, the mobile device processor may use the selected classifier models to determine mobile device features that should be monitored by the observer module 222 and/or analyzed by the analyzer module 224 to determine whether the software application is malicious or benign.

Figure 3B:
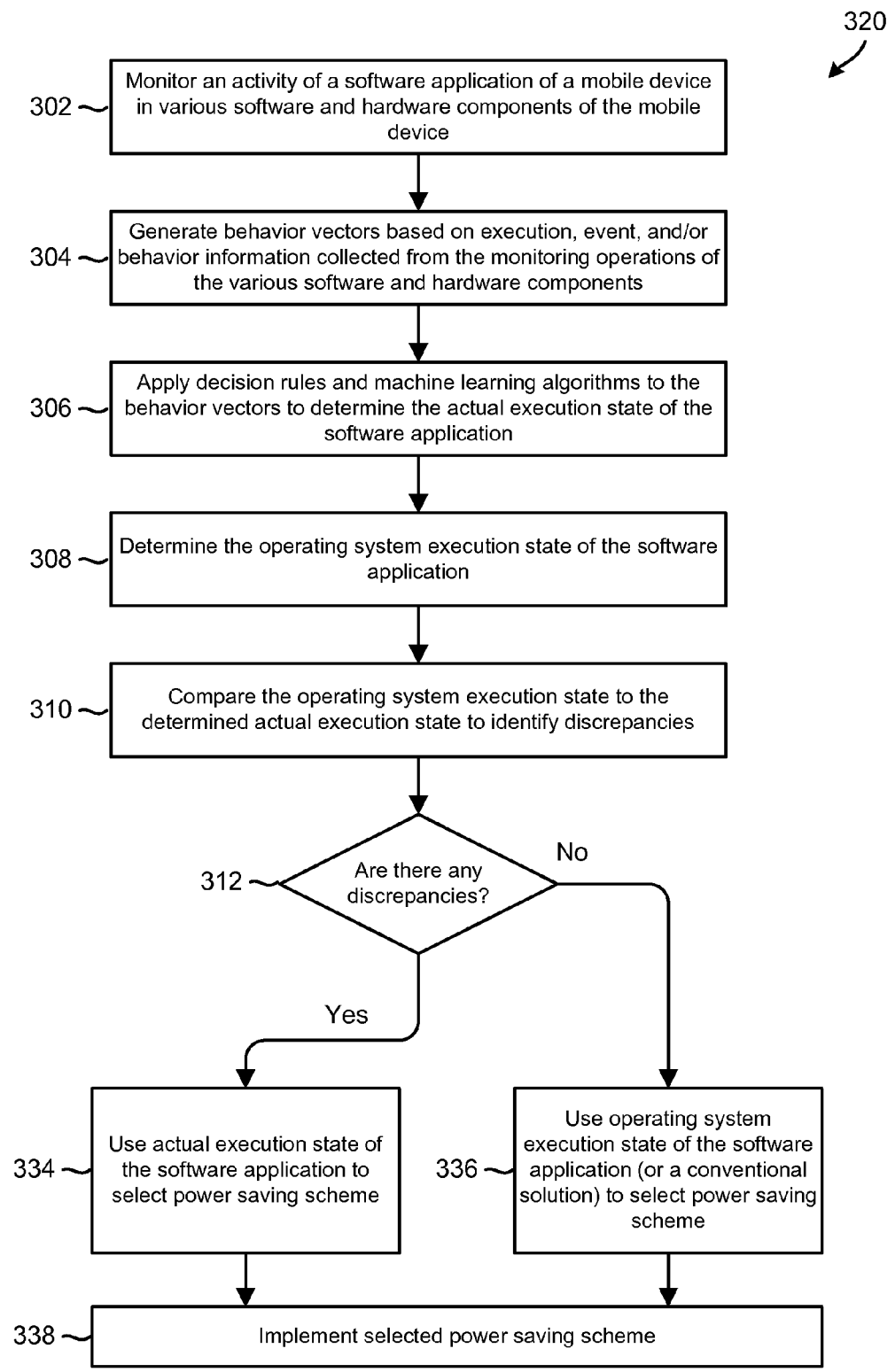
FIG. 3B is a process flow diagram illustrating an aspect method of using the actual execution state of a software application to implement a power saving scheme.

FIG. 3B illustrates an aspect method 320 of determining and using the actual execution state of a software application to implement effective power saving schemes. Method 320 may be performed by a processing core of a mobile device 102. In blocks 302-312, the mobile device processor may perform the same or similar operations as described above for like numbered blocks with reference to FIG. 3A. That is, in block 302, the mobile device processor may monitor an activity of a software application of a mobile device in various software and hardware components of the mobile device. In block 304, the mobile device processor may generate a behavior vector based on execution, event, and/or behavior information collected by the various software and hardware components. In block 306, the mobile device processor may apply decision rules and machine learning algorithms (e.g., classifier models) to the behavior vectors to determine the actual execution state of the software application. In block 308, the mobile device processor may determine the operating system execution state of the software application. In block 310, the mobile device processor may compare the operating system execution state to the determined actual execution state to identify discrepancies between the actual and reported execution states. In determination block 312, the mobile device processor may determine whether there are any discrepancies between the operating system execution state and the computed actual execution state.

In response to determining that there are discrepancies between the operating system execution state and the computed actual execution state (i.e., determination block 312="Yes"), the mobile device processor may use the actual execution state information to determine or select a power saving scheme in block 334. For example, the mobile device processor may use the actual execution state of a software application to identify the actual power consumption or processing requirements of that application, determine the processing cores that should be powered up or down to meet those requirements, determine the times in which the processing cores should be powered up or down in order to balance the mobile device's power consumption and performance characteristics, and select a power saving scheme based on this information.

In response to determining that there are no discrepancies between the operating system execution state and the computed actual execution state, (i.e., determination block 312="No"), the mobile device processor may use the operating system execution state of the software application to determine and select an power saving scheme in block 336. Alternatively, in block 336, the mobile device processor may use any conventional solution known in the art to identify and select a power saving scheme. In block 338, the mobile device processor may use the selected power saving scheme to implement a more effective power saving schemes Implementing the power saving scheme may include placing one or more processors and device resources in a low power state based on the computed actual execution state Implementing the power saving scheme may include monitoring the operating frequency of a processor to determine its current operating frequency, computing a predicted operating frequency value for the processor based the computed actual execution state, and updating (i.e., increasing or decreasing) the processor's frequency based on the predicted operating frequency.

Figure 3C:
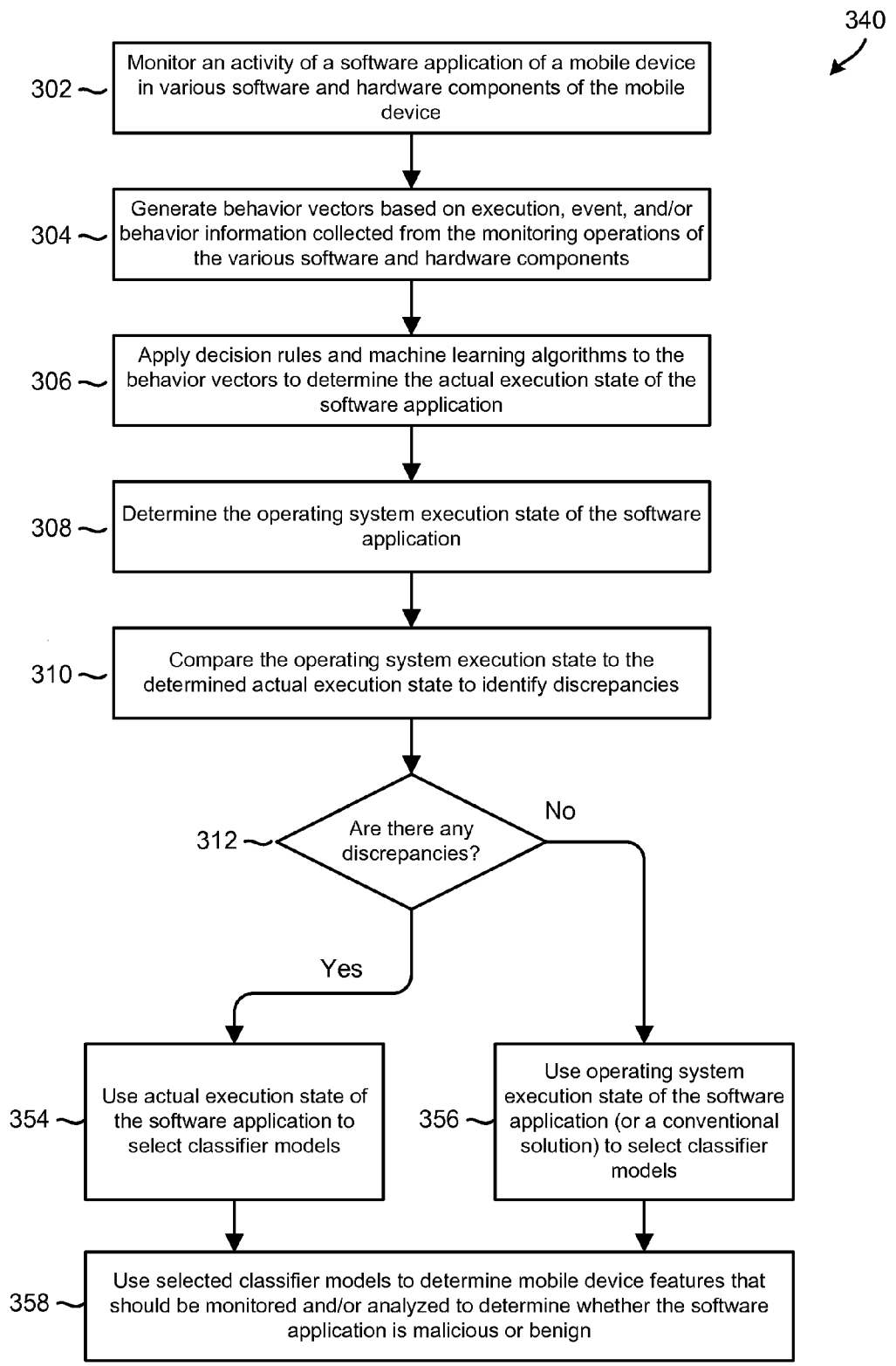
FIG. 3C is a process flow diagram illustrating an aspect method of using the actual execution state of a software application to select classifier models and improve the accuracy and performance of the comprehensive behavioral monitoring and analysis system.

FIG. 3C illustrates an aspect method 340 of determining and using the actual execution state of a software application to improve the accuracy and performance of the comprehensive behavioral monitoring and analysis system. Method 340 may be performed by a processing core of a mobile device 102. In blocks 302-312, the mobile device processor may perform the same or similar operations as described above for like numbered blocks with reference to FIG. 3A.

In block 354 and in response to determining that there are discrepancies between the operating system execution state and the computed actual execution state (i.e., determination block 352="Yes"), the mobile device processor may use the actual execution state of the software application to select a classifier model that focuses on the features most relevant to analyzing the software application or a mobile device behavior that is related to the execution of the software application in the mobile device. In block 358, the mobile device processor may use the selected classifier model to determine mobile device features that should be monitored and/or analyzed to determine whether the software application is malicious or benign. Alternatively, in blocks 354 and 358, the mobile device processor may monitor an activity of the software application, and determining whether the activity is malicious or benign based on the activity and the actual execution state of the software application during which the activity was monitored.

In response to determining that there are no discrepancies between the operating system execution state and the computed actual execution state, (i.e., determination block 322="No"), the mobile device processor may use a conventional solution or the operating system execution state to select a classifier model. In block 358, the mobile device processor may use the selected classifier model to determine mobile device features that should be monitored and/or analyzed to determine whether the software application is malicious or benign.

Figure 3D:
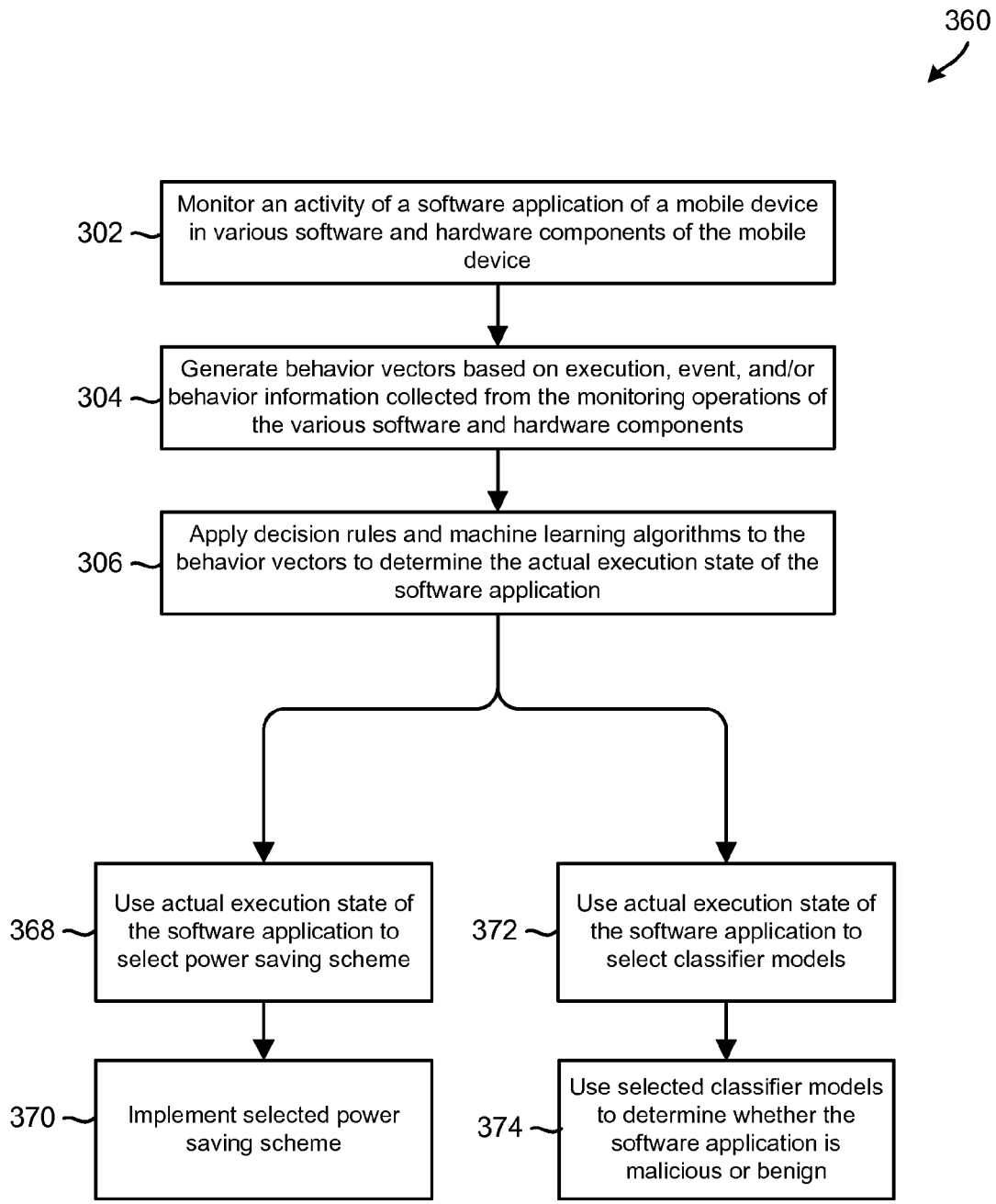
FIG. 3D is a process flow diagram illustrating another aspect method of using the actual execution state to improve the accuracy and performance of the comprehensive behavioral monitoring and analysis system and to implement an effective power saving scheme.

FIG. 3D illustrates an aspect method 360 of determining and using the actual execution state to improve the accuracy and performance of the comprehensive behavioral monitoring and analysis system and/or implement an effective power saving scheme. Method 360 may be performed by a processing core of a mobile device 102. In blocks 302-306, the mobile device processor may perform the same or similar operations as described above for like numbered blocks with reference to FIG. 3A. In block 368, the mobile device processor may use the actual execution state information to determine or select a power saving scheme. In block 370, the mobile device processor may implement the selected power saving scheme to implement a power saving scheme.

In block 372, the mobile device processor may use the actual execution state of the software application to select a classifier model that focuses on the features most relevant to analyzing the software application or a mobile device behavior that is related to the execution of the software application in the mobile device. In block 374, the mobile device processor may use the selected classifier model to determine mobile device features that should be monitored and/or analyzed to determine whether the software application is malicious or benign.

Figure 3E:
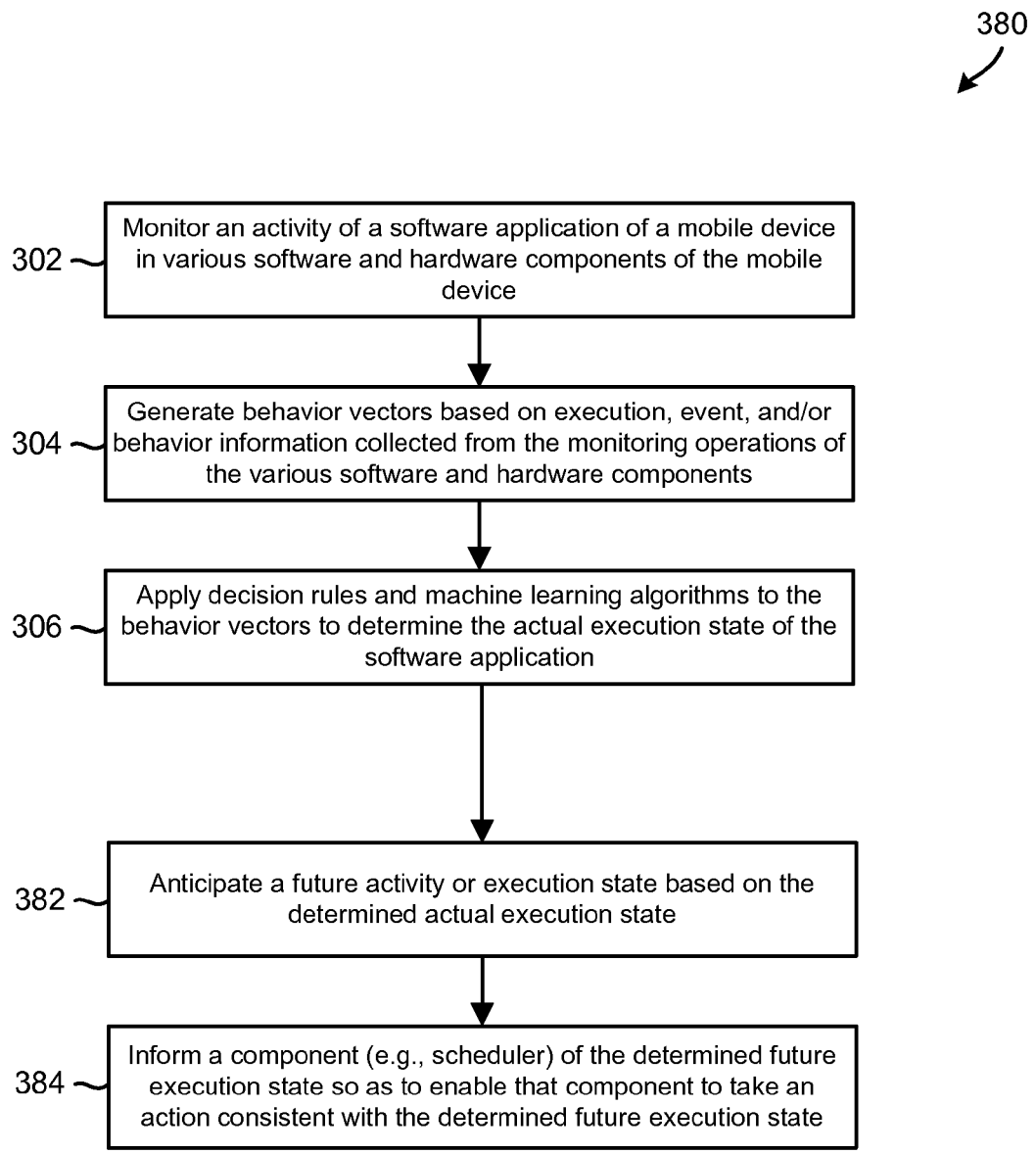
FIG. 3E is a process flow diagram illustrating an aspect method of using the actual execution state to determine a future execution state and improve the performance of the mobile device.

FIG. 3E illustrates an aspect method 380 of determining and using the actual execution state to determine, predict, or anticipate a future execution state, which may be used improve the performance of a computing device. Method 380 may be performed by a processing core of a mobile device 102. In blocks 302-306, the mobile device processor may perform the same or similar operations as described above for like numbered blocks with reference to FIG. 3A.

In block 382, the mobile device processor may use the actual execution state information to determine or anticipate a future activity or execution state based on the determined actual execution state. In an aspect, this may be accomplished by applying a classifier model to a behavior vector. In block 384, the mobile device processor may take an action that is consistent with the determined future execution state. For example, the mobile device processor may perform an operation to inform an operating system scheduler of the mobile device of the anticipated future state. In response, the scheduler may perform actions or operations that are consistent with this determined future execution activity/state, such removing a low priority process from an execution or run queue.

Figure 4:
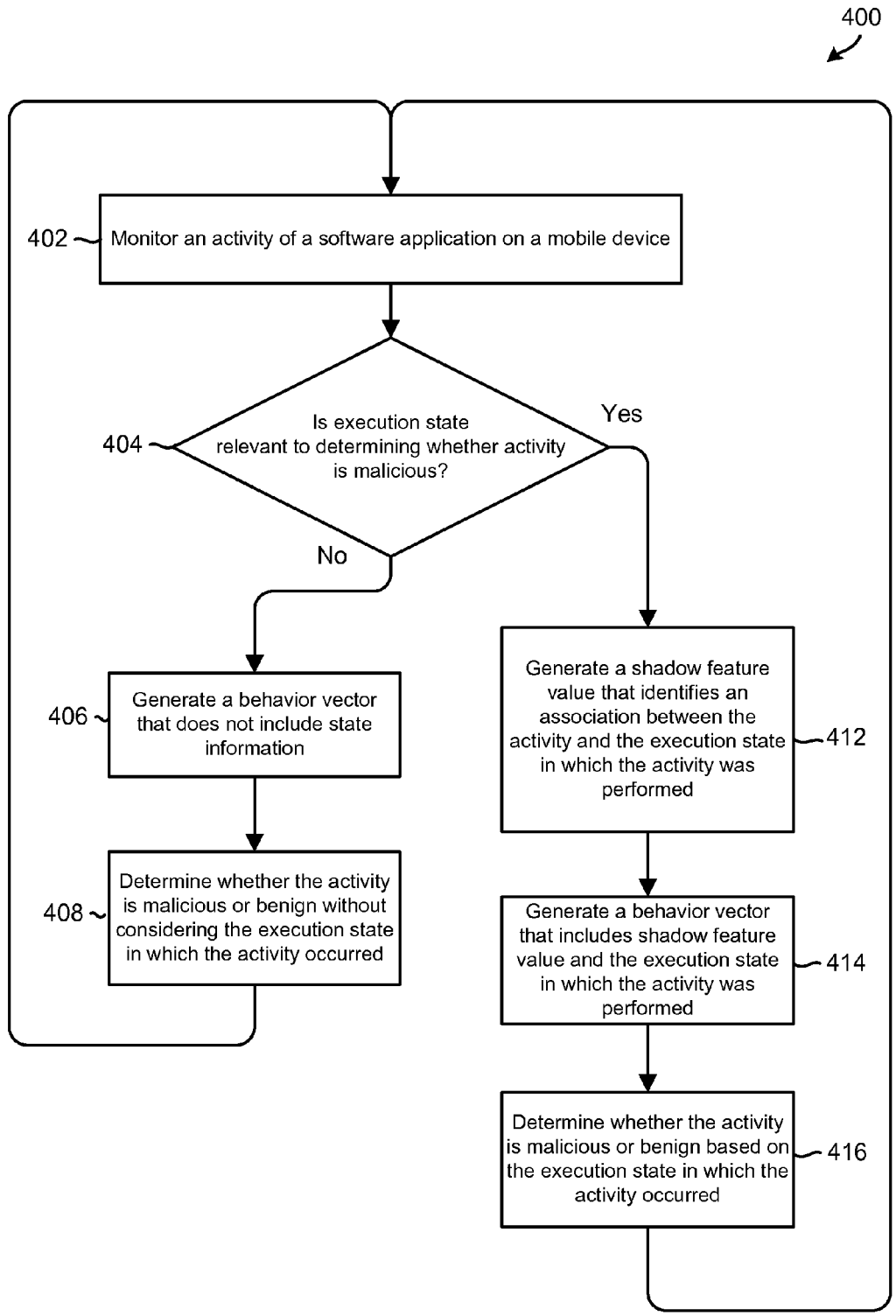
FIG. 4 is a process flow diagram illustrating an aspect method of intelligently generating behavior vectors that are suitable for use in determining whether a mobile device behavior is inconsistent with normal operation patterns without consuming an excessive amount of the processing, memory or battery resources of the mobile device.

FIG. 4 illustrates an aspect method 400 of intelligently generating behavior vectors that are suitable for use in efficiently determining whether a mobile device behaviors inconsistent with normal operation patterns without consuming an excessive amount of the processing, memory or battery resources of the mobile device. Method 400 may be performed by a processing core of a mobile device 102.

In block 402, the mobile device processor may monitor an activity of a software application executing on the mobile device. In determination block 404, the processing core may determine whether the execution state of the software application during the performance of the activity is relevant to determining whether any mobile device behavior, software application, process, task, activity, etc. is malicious or inconsistent with normal operation patterns of the mobile device. In an aspect, this may be accomplished by accessing an execution state relevancy data structure that includes all the various behaviors, software applications, activities, and/or tasks for which the execution state is relevant.

In response to determining that the execution state of the software application during the performance of the activity is not relevant (i.e., determination block 404="No"), in block 406, the processing core may generate a behavior vector that does not include execution state information. In block 408, the processing core may determine whether the activity is malicious or benign based on the behavior information collected from observing/monitoring the components and without considering the execution state in which the activity occurred.

In response to determining that the execution state of the software application during the performance of the activity is relevant for the monitored activity (i.e., determination block 404="Yes"), in block 412, the processing core may generate a shadow feature value that identifies the execution state of the software application during which the activity was monitored. In block 414, the processing core may generate a behavior vector that associates the monitored activity with the shadow feature value identifying the execution state. In block 416, the processing core may determine whether the activity is malicious or benign based on the execution state associated with the activity.

As mentioned above, certain tasks/activities inherently require that the operating system or software application be in an execution state that supports or is compatible with those tasks/activities. For example, the use of a camera, activating a microphone to record audio, sending SMS messages, and the collection accelerometer data are all tasks/activities that require some form of user interaction with the mobile device, and thus these activities must generally be performed in the foreground or in an execution state that supports user interaction with the mobile device.

As a further example, the frequency in which certain tasks/activities are performed in the mobile device when the operating system or software application is in a particular execution state may be a strong indication that a mobile device behavior associated with that activity merits additional or closer scrutiny, monitoring and/or analysis. That is, activities such as sampling sensor data (e.g., accelerometer, gyroscope, compass, pressure sensor etc.), sampling location data, performing WiFi scans, etc. may be performed frequently when the associated software application is running in the foreground as part of a normal or benign mobile device behavior/operation, but should not be performed at that same frequently when the associated software application is running in the background. For example, sampling sensor information frequently when an application is in the background may indicate that the sensor information is being misused by a malicious application, whereas sampling that same sensor information with the same frequency may when the application is in the foreground may be part of a benign mobile device behavior. Similarly, frequent WiFi scans while the application is in the background state may indicate that calls to the location API are being circumvented by a malicious software application or that the WiFi system is being used improperly and/or degrading the overall performance and power consumption characteristics of the mobile device.

In an aspect, the mobile device processor may be configured to identify the tasks/activities that require that the operating system or software application be in an execution state that supports or is compatible with those tasks/activities by reading information from an execution state relevancy data structure (e.g., list, table, map, etc.) stored in a memory of the mobile device. In an aspect, the mobile device processor may be configured with processor-executable instructions to intelligently add or remove entries, features, and executions states to the execution state relevancy data structure based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

Figure 5:
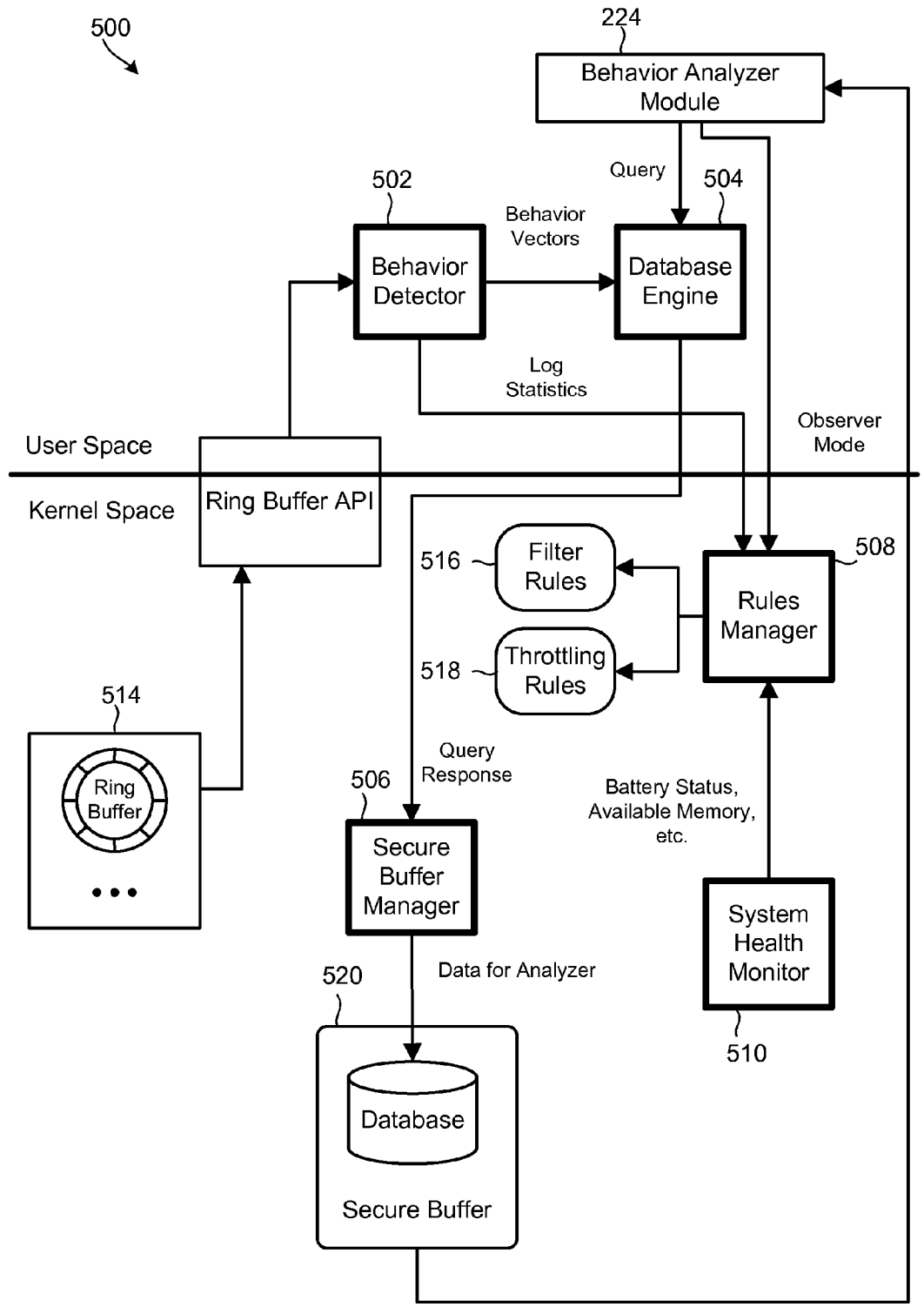
FIG. 5 is a component block diagram illustrating logical components and information flows in a computing system implementing observer modules and observer daemons in accordance with the various aspects.

FIG. 5 illustrates logical components and information flows in a computing system 500 implementing an aspect observer daemon. In the example illustrated in FIG. 5, the computing system 500 includes a behavior detector module 502, a database engine module 504, and a behavior analyzer module 224 in the user space, and a ring buffer 514, a filter rules module 516, a throttling rules module 518, and a secure buffer in the kernel space 520. The computing system 500 may further include an observer daemon that includes the behavior detector module 502 and the database engine 504 in the user space, and the secure buffer manager 506, the rules manager 508, and the system health monitor 510 in the kernel space.

The various aspects may provide cross-layer observations on mobile devices encompassing webkit, SDK, NDK, kernel, drivers, and hardware in order to characterize system behavior. The behavior observations may be made in real time.

Figure 6:
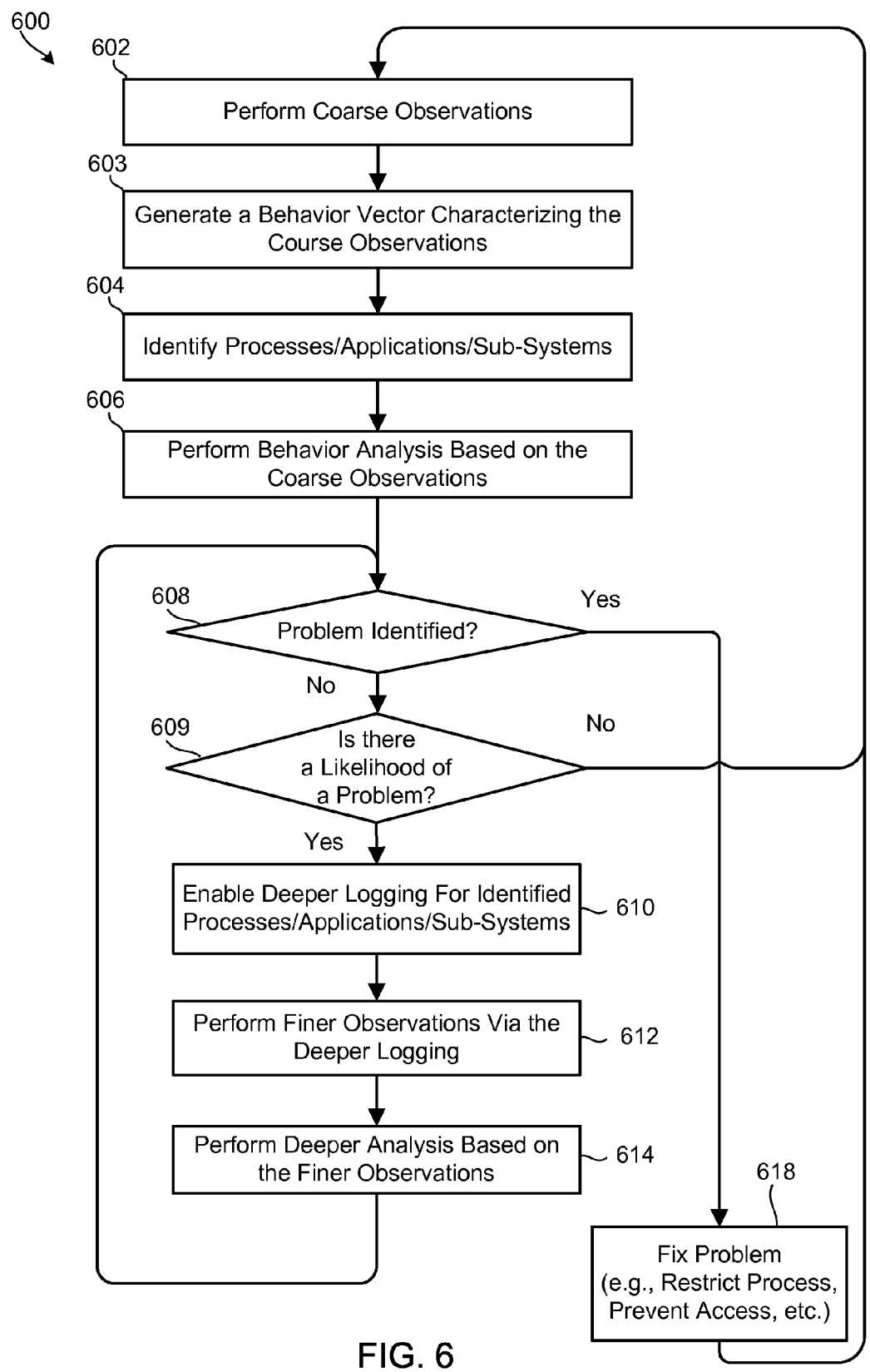
FIG. 6 is a process flow diagram illustrating an aspect method for performing adaptive observations on mobile devices.

FIG. 6 illustrates an example method 600 for performing dynamic and adaptive observations in accordance with an aspect. In block 602, the mobile device processor may perform coarse observations by monitoring/observing a subset of large number factors/behaviors that could contribute to the mobile device's degradation. In block 603, the mobile device processor may generate a behavior vector characterizing the coarse observations and/or the mobile device behavior based on the coarse observations. In block 604, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 606, the mobile device processor may perform behavioral analysis operations based on the coarse observations. In aspect, as part of blocks 603 and 604, the mobile device processor may perform one or more of the operations discussed above.

In determination block 608, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 608="Yes"), in block 618, the processor may initiate a process to correct the behavior and return to block 602 to perform additional coarse observations.

In response to determining that the suspicious behaviors or potential problems can not be identified and/or corrected based on the results of the behavioral analysis (i.e., determination block 608="No"), in determination block 609 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 609="No"), the processor may return to block 602 to perform additional coarse observations.

In response to determining that there is a likelihood that suspicious behaviors or potential problems exist and/or are detectable (i.e., determination block 609="Yes"), in block 610, the mobile device processor may perform deeper logging/observations or final logging on the identified subsystems, processes or applications. In block 612, the mobile device processor may perform deeper and more detailed observations on the identified subsystems, processes or applications. In block 614, the mobile device processor may perform further and/or deeper behavioral analysis based on the deeper and more detailed observations. In determination block 608, the mobile device processor may again determine whether the suspicious behaviors or potential problems can be identified and corrected based on the results of the deeper behavioral analysis. In response to determining that the suspicious behaviors or potential problems can not be identified and corrected based on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

In response to determining that the suspicious behaviors or potential problems can be identified and corrected based on the results of the deeper behavioral analysis (i.e., determination block 608="Yes"), in block 618, the mobile device processor may perform operations to correct the problem/behavior, and the processor may return to block 602 to perform additional operations.

In an aspect, as part of blocks 602-618 of method 600, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Currently, various solutions exist for modeling the behavior of an application program executing on a computing device, and these solutions may be used along with machine learning techniques to determine whether a software application is malicious or benign. However, these solutions are not suitable for use on mobile computing devices because they require evaluating a very large corpus of behavior information, do not generate behavior models dynamically, do not account for capabilities and states of the mobile computing devices, do not intelligently prioritize the features in the behavior model, are limited to evaluating an individual application program or process, and/or require the execution of computationally-intensive processes in the mobile computing device. As such, implementing, performing, or executing these existing solutions in a mobile computing device may have a significant negative and/or user-perceivable impact on the responsiveness, performance, or power consumption characteristics of the mobile computing device.

For example, a computing device may be configured to use an existing machine learning-based solution to access and use a large corpus of training data, derive a model that takes as input a feature vector, and use this model to determine whether a software application of the computing device is malicious or benign. However, such a solution does not generate a full classifier model (i.e., a robust data or behavior model) that describes the large corpus of behavior information in a format or information structure (e.g., finite state machine, etc.) that may be used to generate a lean classifier model. In addition, this solution does not receive identifying information from a mobile computing device that describes the capabilities, functionality, features, configuration, current state, settings, and/or parameters of the device. For at least these reason, such a solution does not allow a server and/or a mobile computing device to quickly and efficiently generate classifier models that include, test, or account for the capabilities and operating states of the mobile computing device. In addition, this solution does not allow a server or a mobile computing device to generate lean classifier models that intelligently identify or prioritize the features in accordance to their relevance to classifying a specific behavior in the specific mobile computing device in which the model is to be used. For these and other reasons, such a solution cannot be used to quickly and efficiently identify, analyze, or classify a complex mobile computing device behavior without having a significant negative or user-perceivable impact on the responsiveness, performance, or power consumption characteristics of the mobile computing device.

In addition to the above-mentioned limitations of existing solutions, many behavior modeling solutions implement a "one-size-fits-all" approach to modeling the behaviors of a computing device, and are therefore not suitable for use in mobile devices. That is, these solutions typically generate the behavior models so that they are generic and may be used in many computing devices and/or with a variety of different hardware and software configurations. As such, these generic behavior models often include/test a very large number of features, many of which are not relevant to (and thus cannot be used for) identifying, analyzing, or classifying a behavior in the specific computing device in which they are actually used. In addition, these solutions do not assign relative priorities to features based their relevance to classifying a specific behavior in the specific mobile device in which the model is used. Therefore, these solutions typically require that a computing device apply behavior models that include a large number of disorganized, improperly prioritized, or irrelevant features. Such models are not suitable for use in resource-constrained mobile devices because they may cause the mobile device processor to analyze a large number of features that are not useful for identifying a cause or source of the mobile device's degradation over time. As such, these existing solutions are not suitable for use in complex-yet resource-constrained mobile devices.

Modern mobile devices are highly configurable and complex systems. As such, the features that are most important for determining whether a particular mobile device behavior is benign or not benign (e.g., malicious or performance-degrading) may be different in each mobile device. Further, a different combination of features may require monitoring and/or analysis in each mobile device in order for that mobile device to quickly and efficiently determine whether a particular behavior is benign or not benign. Yet, the precise combination of features that require monitoring and analysis, and the relative priority or importance of each feature or feature combination, can often only be determined using device-specific information obtained from the specific mobile device in which a behavior is to be monitored or analyzed. For these and other reasons, behavior models generated in any computing device other than the specific device in which they are used cannot include information that identifies the precise combination of features that are most important to classifying a behavior in that device.

For example, if a first mobile device is configured to use its biometric sensors (e.g., fingerprint reader, voice recognition subsystem, retina scanner, etc.) to authorize financial transactions, then features that test conditions relating to the access and use of the biometric sensors are likely to be relevant in determining whether an observed behavior of accessing financial software is malicious or benign in that mobile device. For example, the access and use of the biometric sensors in the first mobile device may indicate that a malicious application is authorizing financial transactions without the user's knowledge or consent. On the other hand, features that test conditions relating to the access and use of these sensors are not likely to be relevant in determining whether the observed behavior of accessing financial software is malicious or benign in a second mobile device which is not configured to use its biometric sensors to authorize financial transactions. That is, since the first and second devices may be identical in all aspects (i.e., are the same type, model, operating system, software, etc.) except for their configuration for the use of their biometric sensors, it would be challenging to generate a generic behavior model that accurately identifies features that evaluate conditions relating to the access and use of the biometric sensors for both devices. It would be even more challenging to generate a generic model that tests much more complicated conditions or features on hundreds of thousands (or millions) of similarly equipment yet independently configurable mobile devices.

Various aspects may overcome these limitations by configuring network servers and mobile devices to work in conjunction with one another to efficiently identify, classify, model, prevent, and/or correct the conditions and/or mobile device behaviors that often degrade a mobile device's performance and/or power utilization levels over time. The network server may be configured to receive information on various conditions, features, behaviors and corrective actions from a central database (e.g., the "cloud"), and use this information to generate a full classifier model (i.e., a data or behavior model) that describes a large corpus of behavior information in a format or structure (e.g., finite state machine, etc.) that can be quickly converted into one or more lean classifier models by a mobile device. In an aspect, the full classifier model may be a finite state machine description or representation of the large corpus of behavior information. In an aspect, the finite state machine may include information that is suitable for expression as a plurality of nodes, boosted decision trees, or decision stumps that each test one or more features. For example, the finite state machine may be an information structure that may be expressed as a family of boosted decision stumps that collectively identify, describe, test, or evaluate all or many of the features and data points that are relevant to determining whether a mobile device behavior is benign or contributing to that mobile device's degradation in performance over time. The network server may then send the full classifier model (i.e., information structure that includes the finite state machine and/or family of boosted decision stumps, etc.) to the mobile device.

In various aspects, the mobile device processor may be configured with processor-executable instructions to receive and use the full classifier model to generate device-specific and/or device-state-specific lean classifier models or a family of lean classifier models of varying levels of complexity (or "leanness"). To accomplish this, the mobile device processor may prune or cull the robust family of boosted decision trees included in the full classifier model received from the network server (herein "full boosted decision tree classifier model") to generate a lean classifier model that includes a reduced number of boosted decision trees and/or evaluates a limited number of test conditions or features. The mobile device processor may then use this locally generated, device-specific and/or device-state-specific classifier models to perform real-time behavior monitoring and analysis operations and identify a source or a cause of an undesirable or performance degrading mobile device behavior.

By generating full classifier models that describe or express a large corpus of behavior information as a finite state machine, decision nodes, decision trees, or other similar information structures that can be modified, culled, augmented, or otherwise used to generate lean classifier models, the various aspects allow the mobile device to generate lean classifier models quickly, efficiently and without accessing training data or further communicating with the network server, the central database, or the cloud network/server. This significantly reduces the mobile device's dependence on the network, and improves the performance and power consumption characteristics of the mobile device.

Further, by generating the lean classifier models locally in the mobile device to account for application and device-specific features, the various aspects allow the mobile device to focus its monitoring operations on the features or factors that are most important for identifying the source or cause of an undesirable or performance depredating mobile device behavior. This allows the mobile device to identify and respond to undesirable or performance degrading mobile device behaviors without causing a significant negative or user-perceivable change in the responsiveness, performance, or power consumption characteristics of the mobile device.

In addition, by equipping the mobile device with a state estimation and prediction module (i.e., the application execution state determination module 208 illustrated in FIG. 2A) that is configured to apply decision rules and machine learning algorithms to the information it receives from various software and hardware components of the mobile device to infer, estimate, predict, or determine a current or future execution state for the software application, the various aspects allow the mobile device to generate and use application execution state information that is independent of, and more accurate and more detailed than, the state information that may be obtained from the operating system or the application. This highly accurate, detailed, and fine grained execution state information may be used by the mobile device to implement a more effective power saving scheme, or by the behavioral monitoring and analysis system of the mobile device to select the most relevant application-specific lean classifier models. This allows the system to better predict whether a mobile device behavior is benign or malicious.

Figure 7:
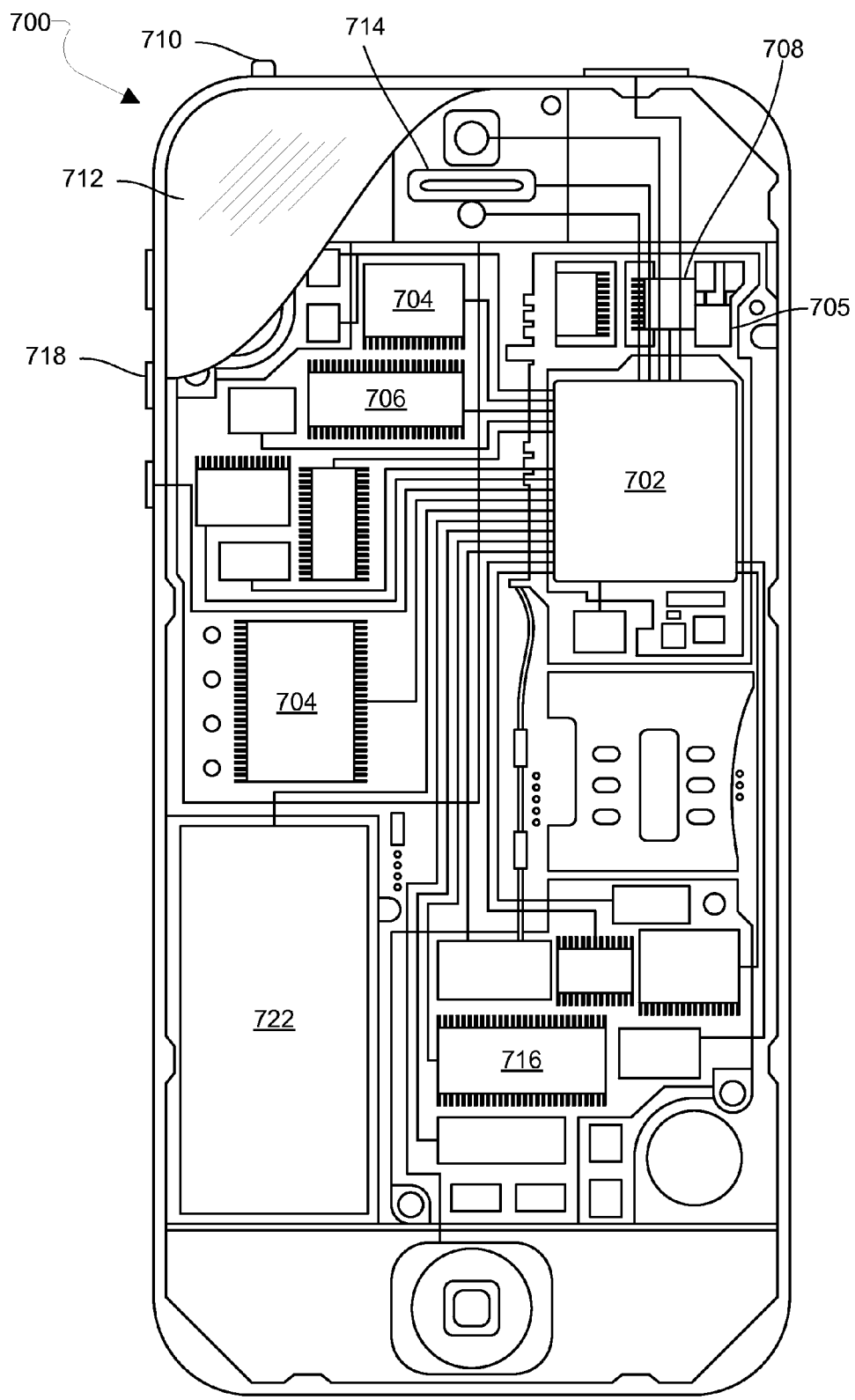
FIG. 7 is a component block diagram of an example mobile device suitable for use with the various aspects.

The various aspects may be implemented on a variety of mobile computing devices, an example of which is illustrated in FIG. 7 in the form of a smartphone 700. The smartphone 700 may include a processor 702 coupled to a touchscreen controller 704 and an internal memory 706. The processor 702 may be one or more multicore ICs designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc.

The smartphone 700 may have one or more radio signal transceivers 708 (e.g., Peanut®, Bluetooth®, Zigbee®, Wi-Fi, radio frequency radio) and antennae 710, for sending and receiving, coupled to each other and/or to the processor 702. The transceivers 708 and antennae 710 may be used with the above-mentioned circuitry to implement the various wireless transmission protocol stacks and interfaces. The multicore device 700 may include a cellular network wireless modem chip 716 that enables communication via a cellular network and is coupled to the processor 702. Smartphones 700 typically also include a speaker 714 and menu selection buttons or rocker switches 718 for receiving user inputs.

A typical smartphone 700 also includes a sound encoding/decoding (CODEC) circuit 722, which digitizes sound received from a microphone into data packets suitable for wireless transmission and decodes received sound data packets to generate analog signals that are provided to the speaker to generate sound. Also, one or more of the processor 702, wireless transceiver 705 and CODEC 722 may include a digital signal processor (DSP) circuit (not shown separately).

Figure 8:
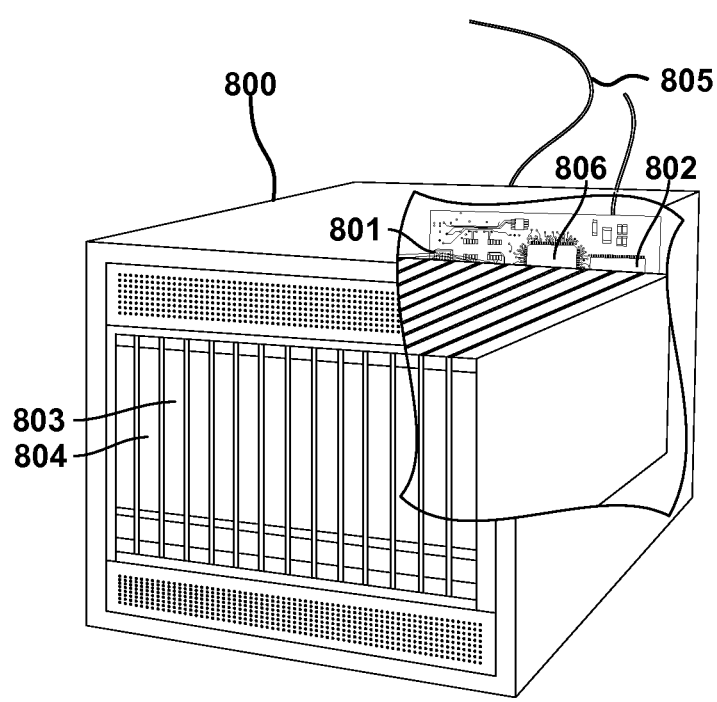
FIG. 8 is a component block diagram of an example server computer suitable for use with the various aspects.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or digital versatile disc (DVD) disc drive 804 coupled to the processor 801. The server 800 may also include network access ports 806 coupled to the processor 801 for establishing data connections with a network 805, such as a local area network coupled to other broadcast system computers and servers.

The processors 702, 801 may be any programmable microprocessor, microcomputer or multiple processor chip or chips that can be configured by software instructions (applications) to perform a variety of functions, including the functions of the various aspects described below. In some mobile devices, multiple processors 702 may be provided, such as one processor dedicated to wireless communication functions and one processor dedicated to running other applications. Typically, software applications may be stored in the internal memory 706, 802, 803 before they are accessed and loaded into the processor 702, 801.

The processor 702, 801 may include internal memory sufficient to store the application software instructions.

The term "performance degradation" is used in this application to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, a behavior vector may be a one-dimensional array, an n-dimensional array of numerical features, an ordered list of events, a feature vector, a numerical representation of one or more objects, conditions or events, a state machine, etc. In an aspect, the behavior vector may include one or more behaviors. In various aspects, a behavior may be represented as a number value or a structure that stores number values (e.g., vector, list, array, etc.).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager," "scheduler," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of determining an execution state of a software application or process in a mobile device, the method comprising:
monitoring in a processor of the mobile device an activity of the software application or process to collect behavior information;
using the collected behavior information to generate a behavior vector that describes the monitored activity via a series of numbers;
applying a classifier model that includes a plurality of test conditions to the generated behavior vector to generate application-and-operating-system-agnostic execution state information; and
using the application-and-operating-system-agnostic execution state information to determine the execution state of the software application or process.

2. The method of claim 1, further comprising:
selecting a power saving scheme based on the determined execution state; and
implementing the selected power saving scheme.

3. The method of claim 1, further comprising:
anticipating a future execution state of the software application or process by applying the classifier model to the behavior vector; and
informing a scheduler of the determined future execution state so as to enable the scheduler to perform an action consistent with the determined future execution state.

4. The method of claim 1, further comprising:
determining an operating system execution state of the software application or process; and
determining whether the determined operating system execution state is the same as the determined execution state.

5. The method of claim 4, further comprising classifying the software application as not benign in response to determining that the operating system execution state is not the same as the determined execution state.

6. The method of claim 1, further comprising:
selecting a behavior classifier model based on the determined execution state; and
using the selected behavior classifier model to determine whether the software application is not benign.

7. The method of claim 6, wherein selecting the behavior classifier model based on the determined execution state comprises selecting an application specific classifier model.

8. The method of claim 6, wherein selecting the behavior classifier model based on the determined execution state comprises:
identifying mobile device features used by the software application; and selecting the behavior classifier model to include the identified features.

9. The method of claim 1, further comprising:
determining whether the execution state of the software application or process is relevant to the activity;
generating a shadow feature value that identifies the execution state of the software application or process during which the activity was monitored in response to determining that the execution state is relevant to the activity;
generating a second behavior vector that associates the activity with the shadow feature value identifying the execution state; and
using the second behavior vector to determine whether the activity is not benign.

10. A computing device, comprising:
a processor configured with processor-executable instructions to perform operations comprising:
monitoring an activity of a software application or process to collect behavior information;
using the collected behavior information to generate a behavior vector that describes the monitored activity via a series of numbers;
applying a classifier model that includes a plurality of test conditions to the generated behavior vector to generate application-and-operating-system-agnostic execution state information; and
using the application-and-operating-system-agnostic execution state information to determine an execution state of the software application or process.

11. The computing device of claim 10, wherein the processor is configured with processor-executable instructions to perform operations further comprising:
selecting a power saving scheme based on the determined execution state; and
implementing the selected power saving scheme.

12. The computing device of claim 10, wherein the processor is configured with processor-executable instructions to perform operations further comprising:
anticipating a future execution state of the software application or process by applying the classifier model to the behavior vector; and
informing a scheduler of the determined future execution state so as to enable the scheduler to perform an action consistent with the determined future execution state.

13. The computing device of claim 10, wherein the processor is configured with processor-executable instructions to perform operations further comprising:
determining an operating system execution state of the software application or process; and
determining whether the determined operating system execution state is the same as the determined execution state.

14. The computing device of claim 13, wherein the processor is configured with processor-executable instructions to perform operations further comprising classifying the software application as not benign in response to determining that the operating system execution state is not the same as the determined execution state.

15. The computing device of claim 10, wherein the processor is configured with processor-executable instructions to perform operations further comprising:
selecting a behavior classifier model based on the determined execution state; and
using the selected behavior classifier model to determine whether the software application is not benign.

16. The computing device of claim 15, wherein the processor is configured with processor-executable instructions to perform operations such that selecting the behavior classifier model based on the determined execution state comprises selecting an application specific classifier model.

17. The computing device of claim 15, wherein the processor is configured with processor-executable instructions to perform operations such that selecting the behavior classifier model based on the determined execution state comprises:
identifying mobile device features used by the software application; and
selecting the behavior classifier model to include the identified features.

18. The computing device of claim 10, wherein the processor is configured with processor-executable instructions to perform operations further comprising:
determining whether the execution state of the software application or process is relevant to the activity;
generating a shadow feature value that identifies the execution state of the software application or process during which the activity was monitored in response to determining that the execution state is relevant to the activity;
generating a second behavior vector that associates the activity with the shadow feature value identifying the execution state; and
using the second behavior vector to determine whether the activity is not benign.

19. A non-transitory computer readable storage medium having stored thereon processor-executable software instructions configured to cause a mobile device processor to perform operations comprising:
monitoring an activity of a software application or process to collect behavior information;
using the collected behavior information to generate a behavior vector that describes the monitored activity via a series of numbers;
applying a classifier model that includes a plurality of test conditions to the generated behavior vector to generate application-and-operating-system-agnostic execution state information; and
using the application-and-operating-system-agnostic execution state information to determine an execution state of the software application or process.

20. The non-transitory computer readable storage medium of claim 19, wherein the stored processor-executable software instructions are configured to cause a mobile device processor of a receiver device to perform operations further comprising:
selecting a power saving scheme based on the determined execution state; and
implementing the selected power saving scheme.

21. The non-transitory computer readable storage medium of claim 19, wherein the stored processor-executable software instructions are configured to cause a mobile device processor to perform operations comprising:
anticipating a future execution state of the software application or process by applying the classifier model to the behavior vector; and
informing a scheduler of the determined future execution state so as to enable the scheduler to perform an action consistent with the determined future execution state.

22. The non-transitory computer readable storage medium of claim 19, wherein the stored processor-executable software instructions are configured to cause a mobile device processor to perform operations comprising:

determining an operating system execution state of the software application or process; and determining whether the determined operating system execution state is the same as the determined execution state.

23. The non-transitory computer readable storage medium of claim 22, wherein the stored processor-executable software instructions are configured to cause a mobile device processor to perform operations comprising:

classifying the software application as not benign in response to determining that the operating system execution state is not the same as the determined execution state.

24. The non-transitory computer readable storage medium of claim 19, wherein the stored processor-executable software instructions are configured to cause a mobile device processor to perform operations comprising:

selecting a behavior classifier model based on the determined execution state; and using the selected behavior classifier model to determine whether the software application is not benign.

25. The non-transitory computer readable storage medium of claim 24, wherein the stored processor-executable software instructions are configured to cause a mobile device processor to perform operations such that selecting the behavior classifier model based on the determined execution state comprises selecting an application specific classifier model.

26. The non-transitory computer readable storage medium of claim 24, wherein the stored processor-executable software instructions are configured to cause a mobile device processor to perform operations comprising such that selecting the behavior classifier model based on the determined execution state comprises:

identifying mobile device features used by the software application; and selecting the behavior classifier model to include the identified features.

27. The non-transitory computer readable storage medium of claim 19, wherein the stored processor-executable software instructions are configured to cause a mobile device processor to perform operations comprising:

determining whether the execution state of the software application or process is relevant to the activity;

generating a shadow feature value that identifies the execution state of the software application or process during which the activity was monitored in response to determining that the execution state is relevant to the activity;

generating a second behavior vector that associates the activity with the shadow feature value identifying the execution state; and using the second behavior vector to determine whether the activity is not benign.

28. A mobile computing device, comprising:

means for monitoring an activity of a software application or process to collect behavior information;

means for using the collected behavior information to generate a behavior vector that describes the monitored activity via a series of numbers;

means for applying a classifier model that includes a plurality of test conditions to the generated behavior vector to generate application-and-operating-system-agnostic execution state information; and means for using the application-and-operating-system-agnostic execution state information to determine an execution state of the software application or process.

29. The mobile computing device of claim 28, further comprising:

means for selecting a power saving scheme based on the determined execution state; and means for implementing the selected power saving scheme.

30. The mobile computing device of claim 28, further comprising:

means for anticipating a future execution state of the software application or process by applying the classifier model to the behavior vector; and means for informing a scheduler of the determined future execution state so as to enable the scheduler to perform an action consistent with the determined future execution state.

* * * * *